(12) United States Patent
Macko et al.

(10) Patent No.: US 11,873,072 B2
(45) Date of Patent: Jan. 16, 2024

(54) PRESSURE BULKHEAD ASSEMBLY METHODS AND SYSTEMS

(71) Applicant: The Boeing Company, Chicago, IL (US)

(72) Inventors: Patrick J. Macko, Charleston, SC (US); Constantin C. Lazar, Charleston, SC (US); Christopher A. Greer, Summerville, SC (US); Santiago M. Mejia, Charleston, SC (US); Nathan W. Vance, Summerville, SC (US)

(73) Assignee: The Boeing Company, Arlington, VA (US)

( * ) Notice: Subject to any disclaimer, the term of this patent is extended or adjusted under 35 U.S.C. 154(b) by 105 days.

(21) Appl. No.: 17/524,888

(22) Filed: Nov. 12, 2021

(65) Prior Publication Data

US 2022/0227470 A1   Jul. 21, 2022

Related U.S. Application Data

(60) Provisional application No. 63/139,369, filed on Jan. 20, 2021.

(51) Int. Cl.
*B64F 5/10*   (2017.01)
*B64C 1/10*   (2006.01)
*G05B 19/402*   (2006.01)

(52) U.S. Cl.
CPC .............. *B64C 1/10* (2013.01); *B64F 5/10* (2017.01); *G05B 19/402* (2013.01); *G05B 2219/45071* (2013.01)

(58) Field of Classification Search
CPC .......... B64C 1/10; B64F 5/10; G05B 19/402; G05B 2219/45071
See application file for complete search history.

(56) References Cited

U.S. PATENT DOCUMENTS

| | | | |
|---|---|---|---|
| 8,756,792 | B2 | 6/2014 | Boyl-Davis et al. |
| 9,429,935 | B2 | 8/2016 | Boyl-Davis et al. |
| 9,952,580 | B2 | 4/2018 | Bode et al. |
| 2010/0161094 | A1 | 6/2010 | Crothers |
| 2014/0365061 | A1 | 12/2014 | Vasquez et al. |

(Continued)

FOREIGN PATENT DOCUMENTS

| | | |
|---|---|---|
| EP | 2 727 821 | 5/2014 |
| EP | 3 028 940 | 6/2016 |

(Continued)

*Primary Examiner* — Nirvana Deonauth
(74) *Attorney, Agent, or Firm* — Walters & Wasylyna LLC

(57) ABSTRACT

A method for making a pressure bulkhead assembly of an aircraft includes determining first locations and first orientations of a plurality of first holes, pre-drilled in an aft pressure bulkhead. The method also includes determining a first surface profile of a first interface surface of the aft pressure bulkhead and determining a second surface profile of a second interface surface of each one of a plurality of splice angles. The method also includes determining second locations and second orientations of a plurality of second holes to be drilled in each one of the plurality of splice angles corresponding to the plurality of first holes in the aft pressure bulkhead and drilling the plurality of second holes in each one of the plurality of splice angles at the second locations and second orientations.

20 Claims, 18 Drawing Sheets

(56) References Cited

U.S. PATENT DOCUMENTS

| | | |
|---|---|---|
| 2017/0220021 A1 | 8/2017 | Bode et al. |
| 2018/0208328 A1 | 7/2018 | Charlton et al. |
| 2019/0039711 A1* | 2/2019 | Diep .................. B64C 1/12 |

FOREIGN PATENT DOCUMENTS

| | | |
|---|---|---|
| EP | 3 199 298 | 8/2017 |
| JP | 2012 024920 | 2/2012 |
| WO | WO 01/76943 | 10/2001 |
| WO | WO 2009/128992 | 10/2009 |
| WO | WO 2011/062696 | 5/2011 |

* cited by examiner

PRESSURE BULKHEAD ASSEMBLY METHODS AND SYSTEMS

PRIORITY

This application claims priority from U.S. Ser. No. 63/139,369 filed on Jan. 20, 2021.

FIELD

The present disclosure relates generally to methods and systems for joining structural components and, more particularly, to methods and systems for joining structural components associated with a pressure bulkhead assembly of an aircraft.

BACKGROUND

Pressure bulkheads are often used in aircraft to separate a pressurized section of a fuselage from an unpressurized section. In some applications, the pressure bulkhead may be mounted within the fuselage and attached to the outer skin of one or more sections of the fuselage. In some instances, the pressure bulkhead is mounted to the aircraft using a plurality of angled members, referred to herein as splice angles, and stringer end fittings.

The splice angles and the pressure bulkhead are typically assembled on a drill jig using assembly jig tooling. In particular, the pressure bulkhead is initially joined with the splice angles. Subsequently, holes are drilled through the pressure bulkhead and the splice angles while both are temporarily joined to each other. However, the use of drill jigs to drill such primary structural joints may result in oversized holes, may require multiple measurement and alignment steps, and/or may require the pressure bulkhead and the splice angles to be repeatedly placed and removed from the jig, with any or all leading to production lags. The use of drill jigs may also lead to design of shims or spacers larger than desired. Also, the flexibility of carbon fiber materials that make up some of the pressure bulkhead components can make it harder to machine the surface of the pressure bulkhead and holes when the pressure bulkhead is attached to the jig.

Thus, there is a need for an assembly method for pressure bulkheads that reduces installation time, increases the accuracy of the size of the hole, increases the accuracy of the location of the hole, reduces labor, is readily automated, and minimizes wastage of parts. Accordingly, those skilled in the art continue with research and development efforts in the field of pressure bulkhead assembly.

SUMMARY

Disclosed are examples of a method of making a pressure bulkhead assembly, a system for making a pressure bulkhead assembly, and a pressure bulkhead assembly for an aircraft. The following is a non-exhaustive list of examples, which may or may not be claimed, of the subject matter according to the present disclosure.

In an example, the disclosed method includes steps of: (1) determining first locations of a plurality of first holes, pre-drilled in an aft pressure bulkhead; (2) determining first orientations of the plurality of first holes in the aft pressure bulkhead; (3) determining a first surface profile of a first interface surface of the aft pressure bulkhead; (4) determining a second surface profile of a second interface surface of each one of a plurality of splice angles that corresponds to an associated portion of the first interface surface of the aft pressure bulkhead, wherein the plurality of splice angles is configured to be coupled to the aft pressure bulkhead; (5) determining second locations and second orientations of a plurality of second holes to be drilled in the plurality of splice angles, wherein the plurality of second holes correspond to the plurality of first holes in the aft pressure bulkhead; and (6) drilling the plurality of second holes in each one of the plurality of splice angles at the second locations and the second orientations.

In an example, the disclosed system includes a spatial relation apparatus including a measurement machine and a computer system having a memory storing a program and a processor. The processor is configured to execute the program to perform the steps of: (1) determine first locations of a plurality of first holes, pre-drilled in an aft pressure bulkhead; (2) determine first orientations of the plurality of first holes in the aft pressure bulkhead; (3) determine a first surface profile of a first interface surface of the aft pressure bulkhead; (4) determine a second surface profile of a second interface surface of each one of a plurality of splice angles that corresponds to an associated portion of the first interface surface of the aft pressure bulkhead, wherein the plurality of splice angles is configured to be coupled to the aft pressure bulkhead; and (5) determine second locations and second orientations of a plurality of second holes to be drilled in the plurality of splice angles, wherein the plurality of second holes correspond to the plurality of first holes in the aft pressure bulkhead. The system also includes a Computer Numerically Controlled machine configured to drill the plurality of second holes in each one of the plurality of splice angles at the second locations and the second orientations.

In an example, the disclosed pressure bulkhead assembly includes an aft pressure bulkhead including a first interface surface and a plurality of first holes pre-drilled through the first interface surface. The pressure bulkhead assembly also includes a plurality of splice angles configured to be coupled to the aft pressure bulkhead. Each one of the plurality of splice angles includes second interface surface and a plurality of second holes drilled through the second interface surface and corresponding to a portion of the plurality of first holes in the aft pressure bulkhead. The plurality of second holes is drilled by a Computer Numerically Controlled machine executing a validated Network Computer program based on second locations and second orientations of the plurality of second holes to be drilled in each one of the plurality of splice angles. The second locations and the second orientations of the plurality of second holes are determined based on a virtual overlay of a first three-dimensional profile of the aft pressure bulkhead and a second three-dimensional profile of each one of the plurality of splice angles. The first three-dimensional profile of the aft pressure bulkhead is determined by determining first locations and first orientations of the plurality of first holes in the aft pressure bulkhead and determining a first surface profile of the first interface surface of the aft pressure bulkhead. The second three-dimensional profile of each one of the plurality of splice angles is determined by determining a second surface profile of the second interface surface of each of the splice angles.

Other examples of the disclosed method, system and structural assembly will become apparent from the following detailed description, the accompanying drawings, and the appended claims.

DETAILED DESCRIPTION

Figure 1:
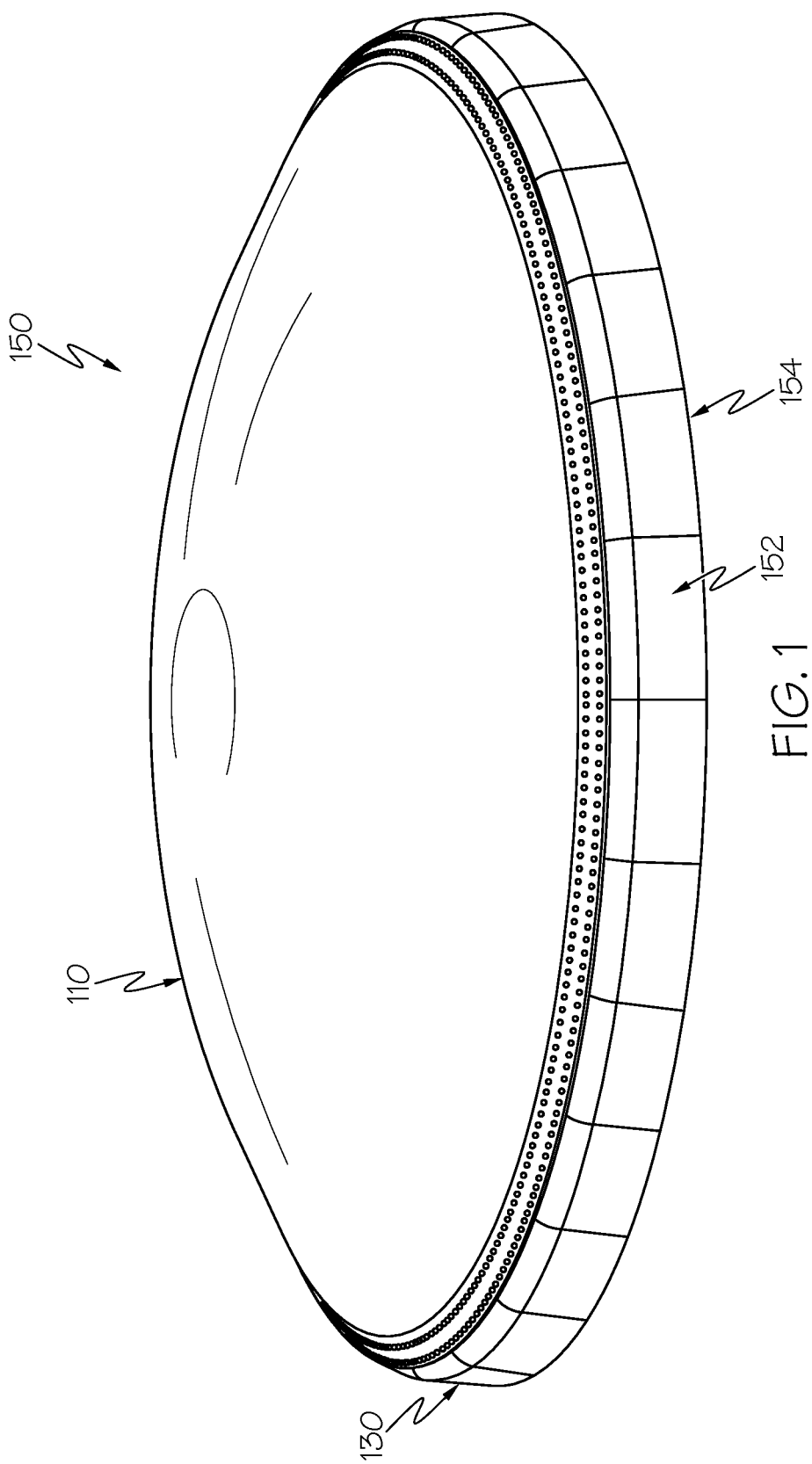
FIG. 1 is a schematic, perspective view of an example of a pressure bulkhead assembly.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Figure 4:
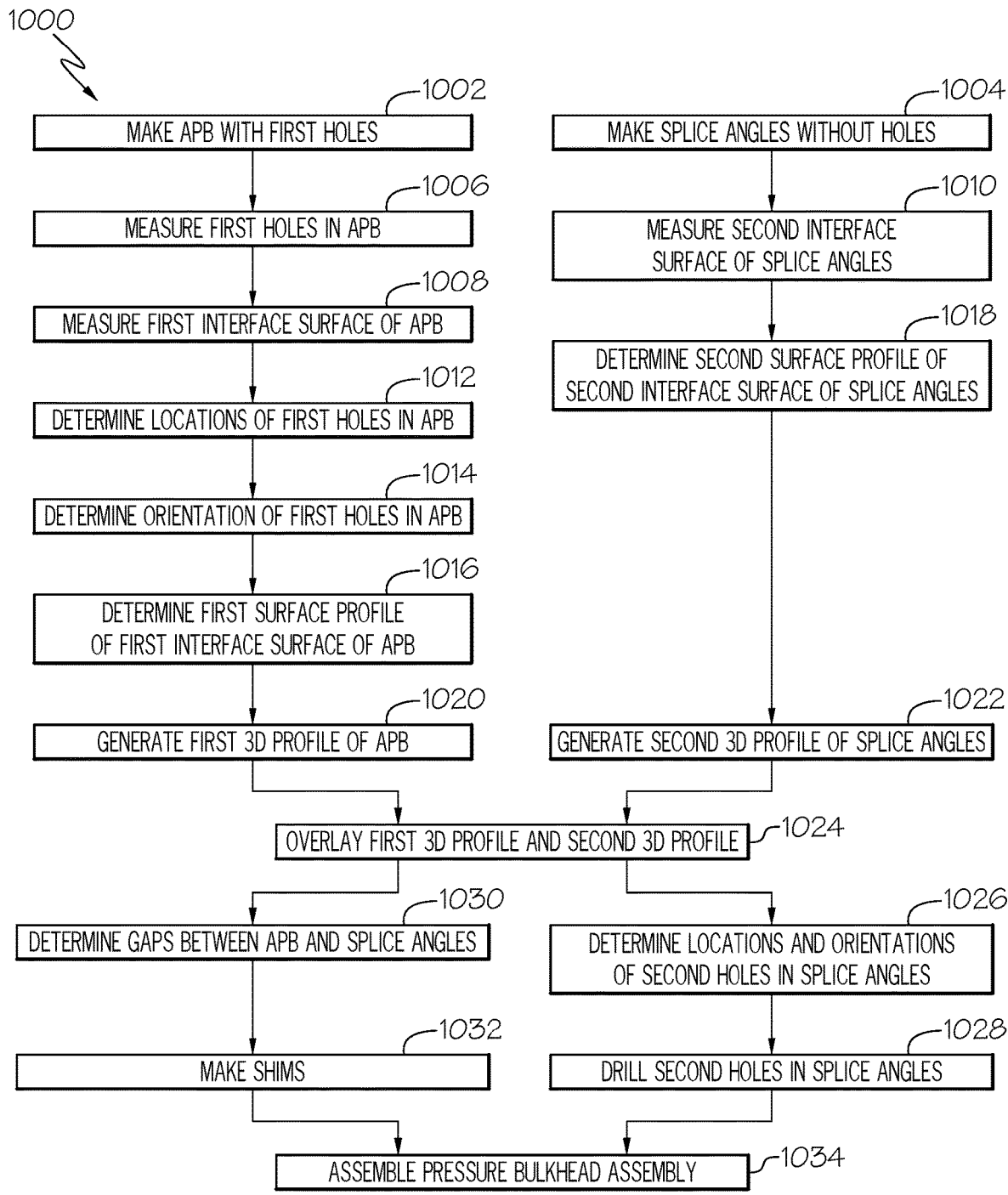
FIG. 4 is a flowchart of an example of a method of making the pressure bulkhead assembly.
Figure 5:
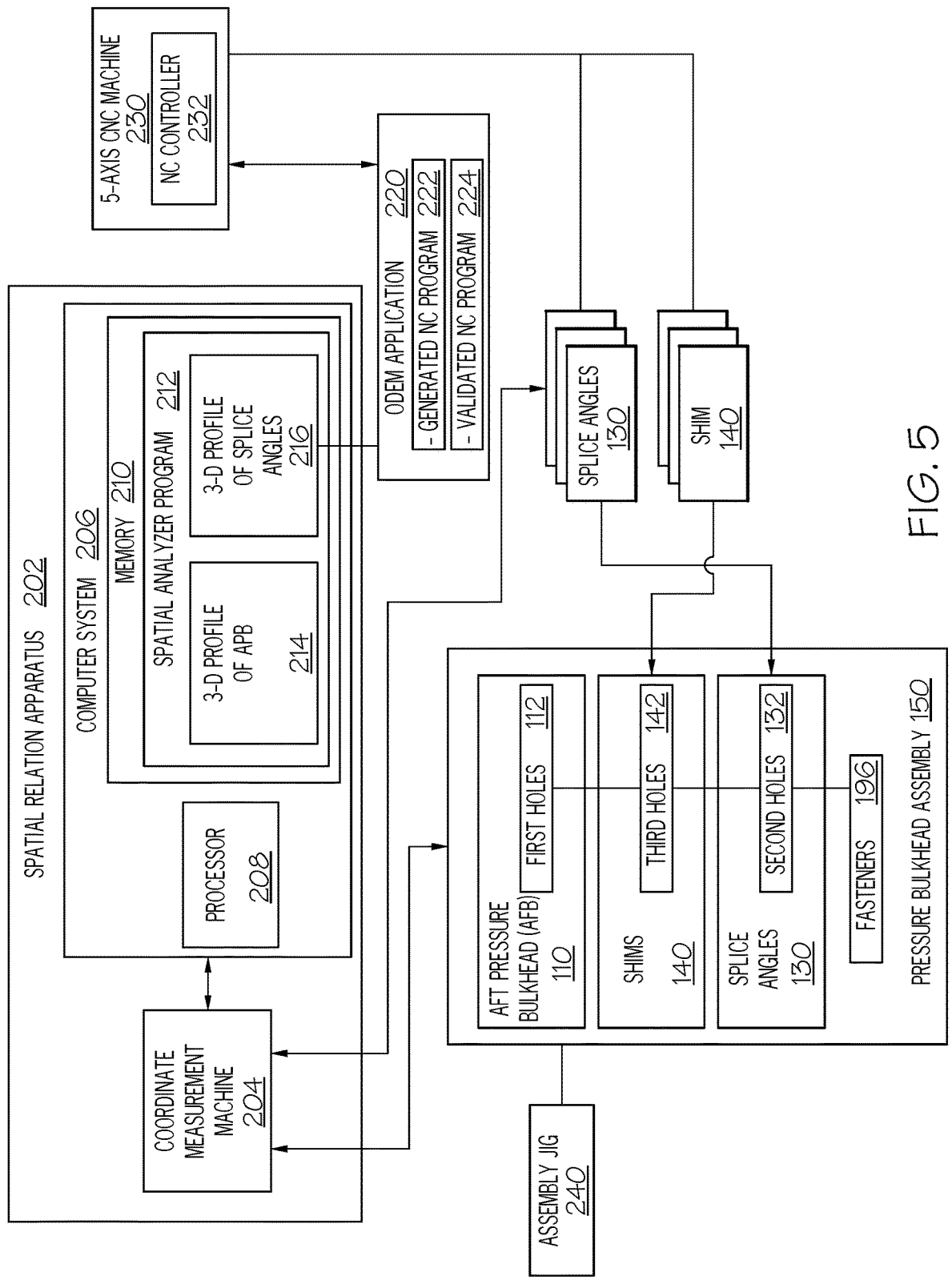
FIG. 5 is a schematic block diagram of an example of a system for making the pressure bulkhead assembly.

Referring to FIG. 1, by way of examples, the present disclosure is directed to a pressure bulkhead assembly 150 that includes an aft pressure bulkhead 110 and a plurality of splice angles 130. Referring generally to FIG. 4, by way of examples, the present disclosure is directed to a method 1000 of installing the plurality of splice angles 130 on the aft pressure bulkhead 110 to make the pressure bulkhead assembly 150. Referring generally to FIG. 5, by way of examples, the present disclosure is also directed to a system 200 for installing the plurality of splice angles 130 on the aft pressure bulkhead 110 to make the pressure bulkhead assembly 150. In one or more examples, the method 1000 is implemented using the system 200.

Examples of the system 200 and method 1000, described herein, use measurements of locations and orientations of pre-drilled full-size holes in the aft pressure bulkhead 110, measurements of surface profiles of the aft pressure bulkhead 110, and measurements of surface profiles of the splice angles 130 to determine locations and orientations of full-size holes to be drilled in the splice angles 130. Examples of the system 200 and method 1000, described herein, also facilitate drilling the full-size holes in the splice angles 130 at the determined locations and orientations. The full-size holes that are drilled in the splice angles 130 correspond to the pre-drilled full-size holes in the aft pressure bulkhead 110. Examples of the system 200 and method 1000, described herein, also facilitate installation of the splice angles 130 on the aft pressure bulkhead 110 using a plurality of fasteners inserted through aligned pairs of full-size holes in the splice angles 130 and full-size holes in the aft pressure bulkhead 110.

Furthermore, examples of the system 200 and method 1000, described herein, also facilitate identifying dimensions of gaps formed between the aft pressure bulkhead 110 and the splice angles 130 and forming shims 140 based on those gap dimensions. Examples of the system 200 and method 1000, described herein, further facilitate determining locations and orientations of full-size holes to be drilled in the shims 140 and drilling the full-size holes in the shims 140 at the determine locations and orientations. Examples of the system 200 and method 1000, described herein, additionally facilitate installing the shims 140 between the aft pressure bulkhead 110 and the splice angles 130.

Referring now to FIG. 1, which schematically illustrates an example of the pressure bulkhead assembly 150. The pressure bulkhead assembly 150 includes, or is formed of, the aft pressure bulkhead 110 and the splice angles 130, installed on (e.g., fastened to) the aft pressure bulkhead 110. The splice angles 130 are positioned adjacent to one another and are joined to the aft pressure bulkhead 110. The splice angles 130 form a circumferential surface 152. The circumferential surface 152 has a nominal shape 154.

The aft pressure bulkhead 110 may take the form of a panel, a disk or a dome (e.g., be dome-shaped). Accordingly, the aft pressure bulkhead 110 may also be referred to as an aft pressure bulkhead dome or as an aft pressure bulkhead panel. For simplicity, the aft pressure bulkhead may also be referred to herein or in the accompanying figures as "APB". Generally, the pressure bulkhead assembly 150 is sized and shaped for placement inside a fuselage 156 of an aircraft 104 (FIG. 2) such that the aft pressure bulkhead 110 separates a pressurized portion of an interior 172 (FIG. 2) of the aircraft 104 (e.g., a pressurized cabin) from an unpressurized portion of the interior 172 and the splice angles 130 form a pressure seal. In one or more examples, the pressure bulkhead assembly 150 is attached to a skin 170 (FIG. 2) of the fuselage 156 via the splice angles 130.

The aft pressure bulkhead 110 and the splice angles 130 may be formed of any suitable material. For example, the aft pressure bulkhead 110 and the splice angles 130 may be formed of a composite material. The material of the aft pressure bulkhead 110 and the material of the splice angles 130 may be the same or different.

Figure 2:
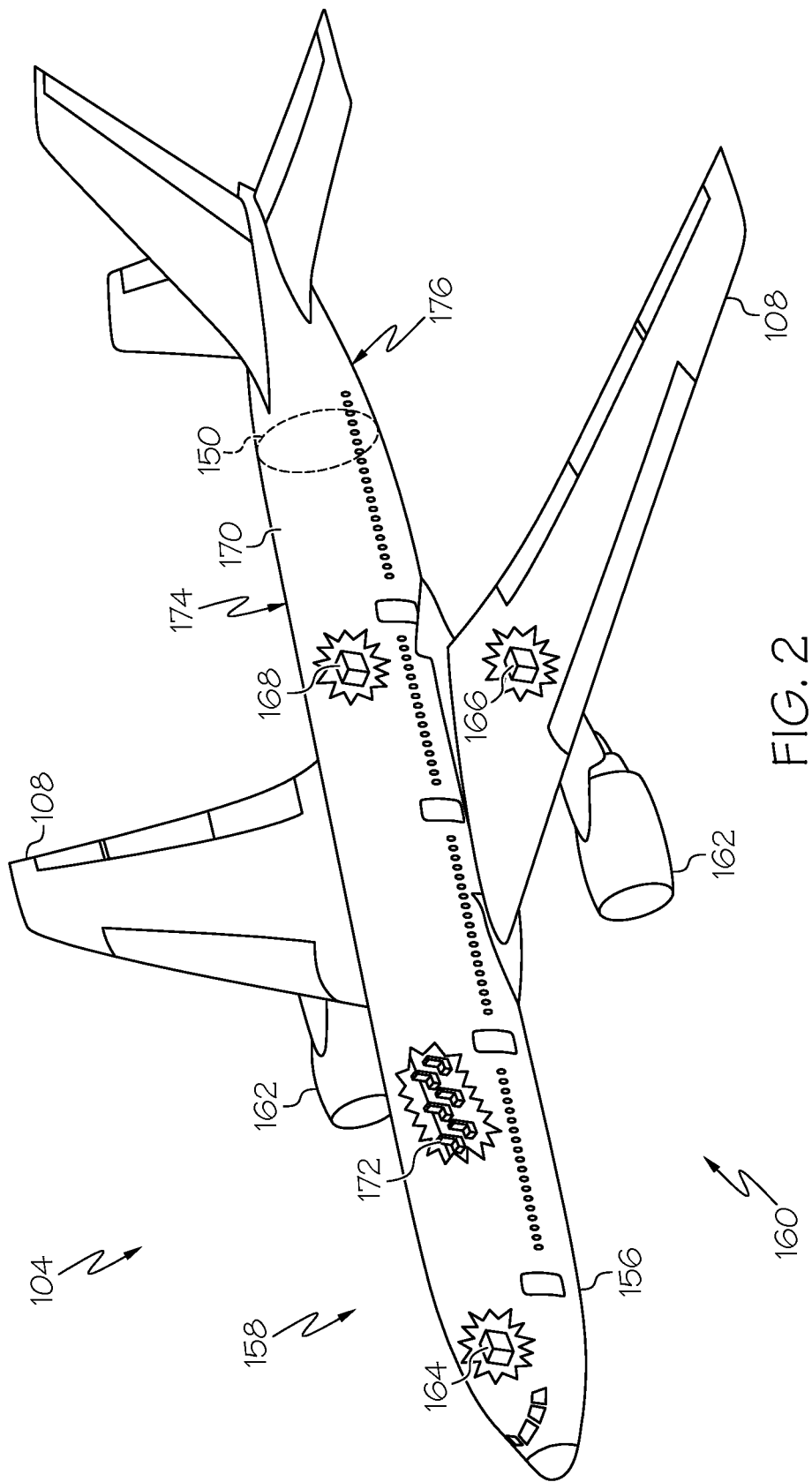
FIG. 2 is a schematic illustration of an example of an aircraft that includes the pressure bulkhead assembly.

Referring now to FIG. 2, which schematically illustrates an example of an aircraft 104 in which pressure bulkhead assembly 150 is used. The pressure bulkhead assembly 150 divides a pressurized side of the aircraft 104 from an unpressurized side of the aircraft 104. The splice angles 130 (FIG. 1) are installed on the aft pressure bulkhead 110 (FIG. 1) on the pressurized side of the aft pressure bulkhead 110. As an example, the aircraft 104 includes a fuselage 156 and wings 108 attached to and outwardly extending from the fuselage 156. The fuselage 156 includes a plurality of fuselage sections (e.g., barrel sections). The fuselage 156 (e.g., each fuselage section) has skin 170, coupled to an airframe 158, that forms an exterior of the aircraft 104. The pressure bulkhead assembly 150 separates a first fuselage section 174 (e.g., pressurized side) from a second fuselage section 176 (e.g., unpressurized side) in an aft portion of the fuselage 156. For example, in FIG. 3, arrow 250 indicates a direction of a forward (e.g., pressurized) portion of the aircraft 104.

Figure 3:
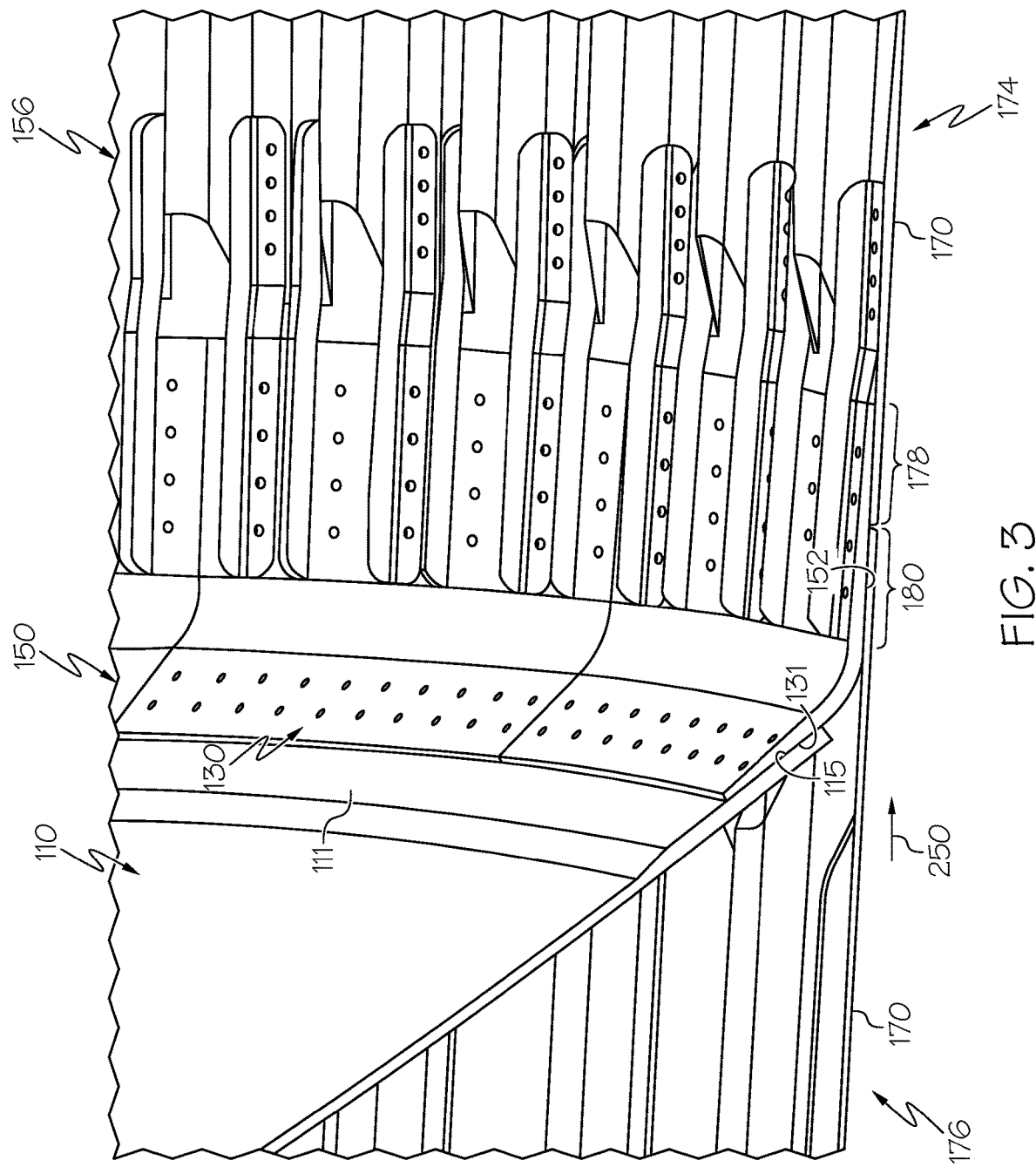
FIG. 3 is a schematic, cut away, perspective view of an example of a portion of the pressure bulkhead assembly coupled to a fuselage of the aircraft.

Referring now to FIG. 3, which schematically illustrates an example of a portion of the pressure bulkhead assembly 150 attached to the first fuselage section 174 and the second fuselage section 176, viewed from within the fuselage 156. The splice angles 130 overlap a skin-first portion 178 of the skin 170 of the first fuselage section 174 and a skin-second portion 180 of the skin 170 of the second fuselage section 176. The splice angles 130 are attached (e.g., fastened by a plurality of fasteners) to the skin-first portion 178 and to the skin-second portion 180. In this manner, the splice angles 130 join the aft pressure bulkhead 110, the first fuselage section 174 and the second fuselage section 176 together. Accordingly, the splice angles 130 may also be referred to as skin splice angles.

As an example, during fabrication of the aircraft 104, the pressure bulkhead assembly 150 is attached to the second fuselage section 176 by fastening the splice angles 130 to the skin-second portion 180. The first fuselage section 174 is then positioned adjacent to the second fuselage section 176 such that the splice angles 130 overlap the skin-first portion 178. The pressure bulkhead assembly 150 is attached to the first fuselage section 174 by fastening the splice angles 130 to the skin-first portion 178. The nominal shape 154 (FIG. 1) of the circumferential surface 152, formed by the splice angles 130, is complementary to the barrel shape of the skins 170 of the first fuselage section 174 and the second fuselage section 176. Accordingly, the splice angles 130 are positioned on the pressurized side of the aft pressure bulkhead 110 and are configured to form a pressure seal for the fuselage 156 (FIG. 2) between the first fuselage section 174 and the second fuselage section 176.

In one or more examples, shims (not shown in FIG. 3) may be positioned between the circumferential surface 152 of the splice angles 130 and the skin-first portion 178 and/or the skin-second portion 180 to fill any gaps that exist between the splice angles 130 and the skin-first portion 178 and/or the skin-second portion 180, for example, in areas where the nominal shape 154 of the circumferential surface 152 does not match the barrel shape of the first fuselage section 174 and/or the second fuselage section 176.

Figure 6:
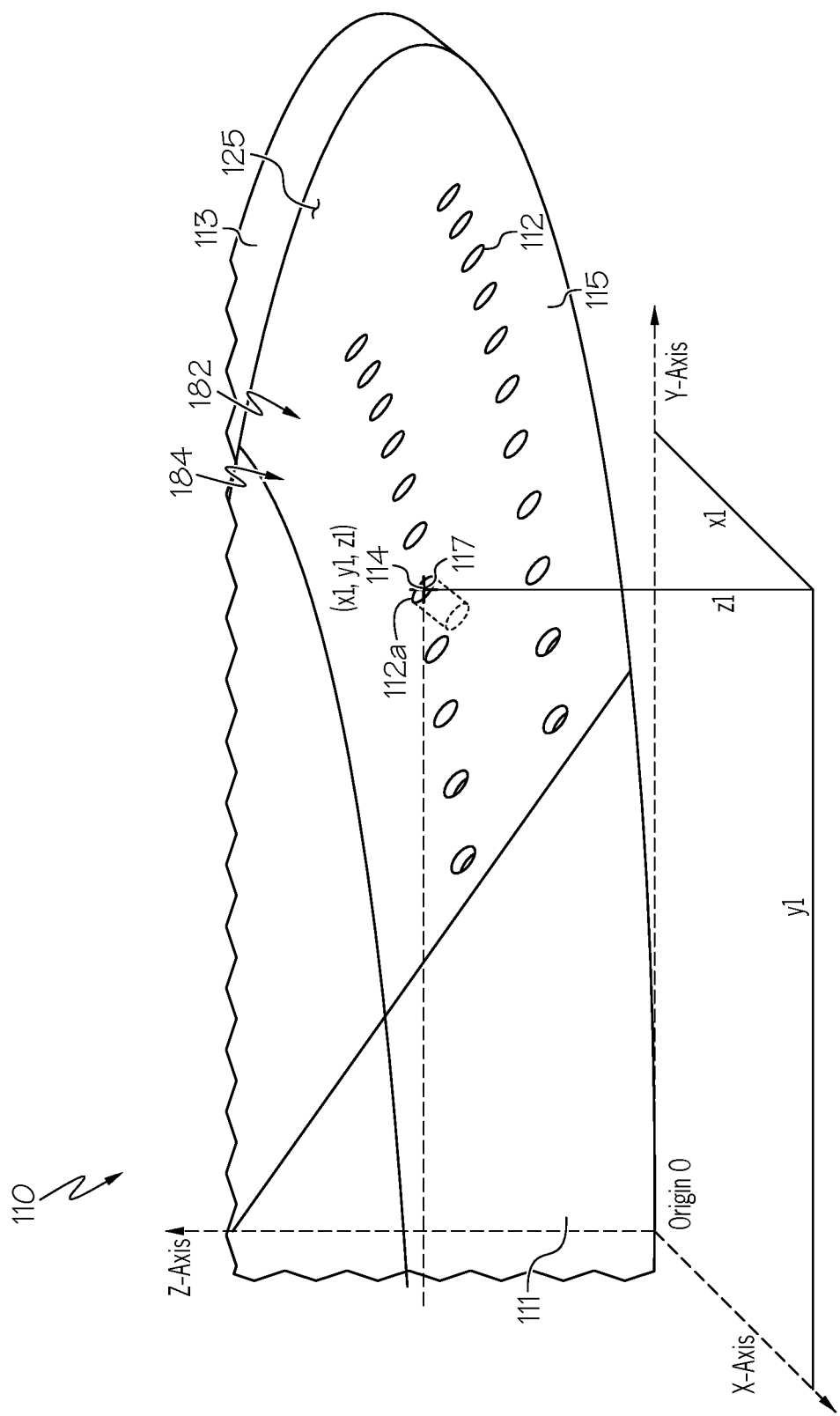
FIG. 6 is a schematic, cut away, perspective view of an example of a portion of an inner surface of an aft pressure bulkhead of the pressure bulkhead assembly.
Figure 7:
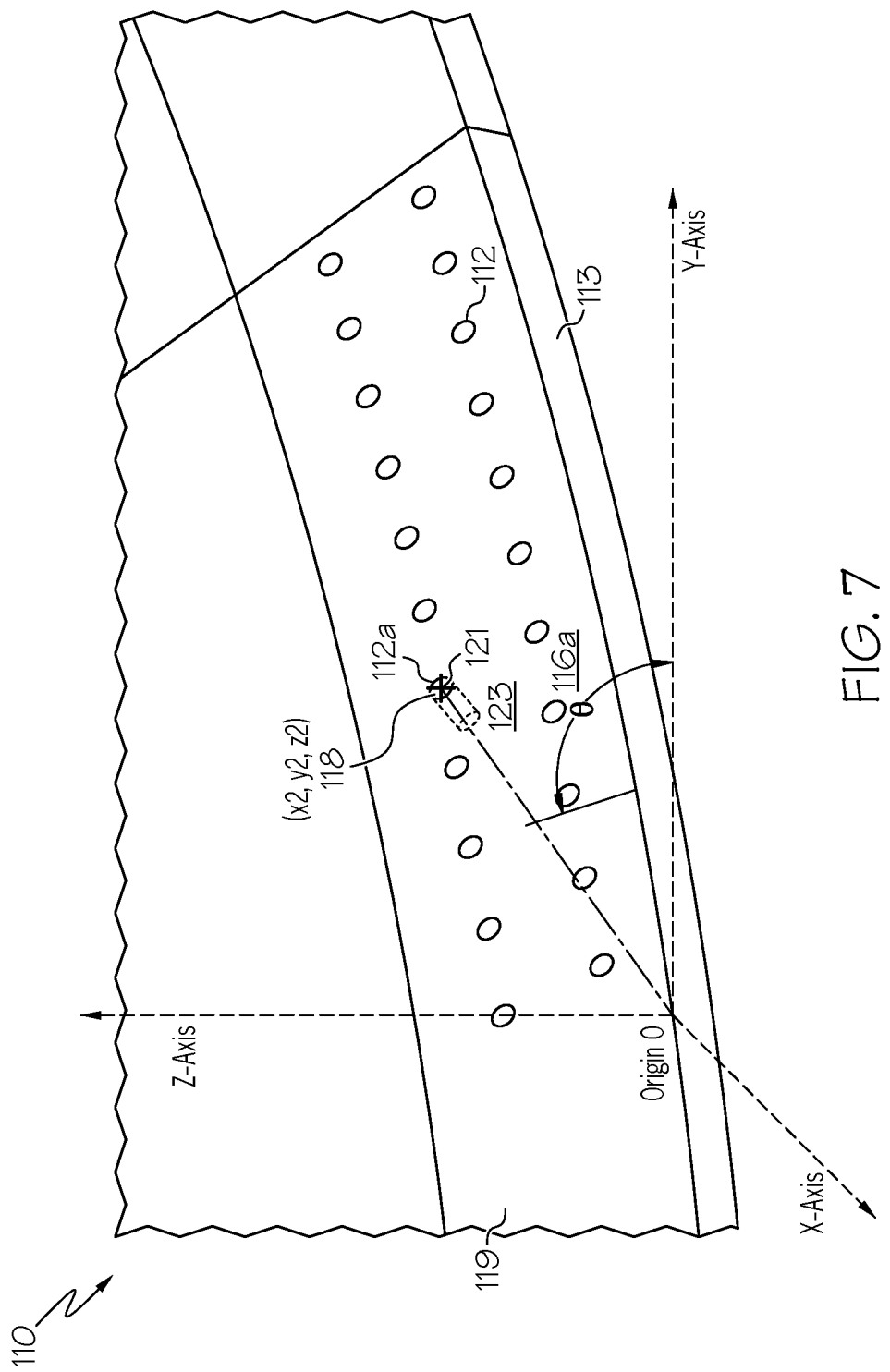
FIG. 7 is a schematic, cut away, perspective view of an example of a portion of an outer surface of the aft pressure bulkhead pressure bulkhead assembly.
Figure 8:
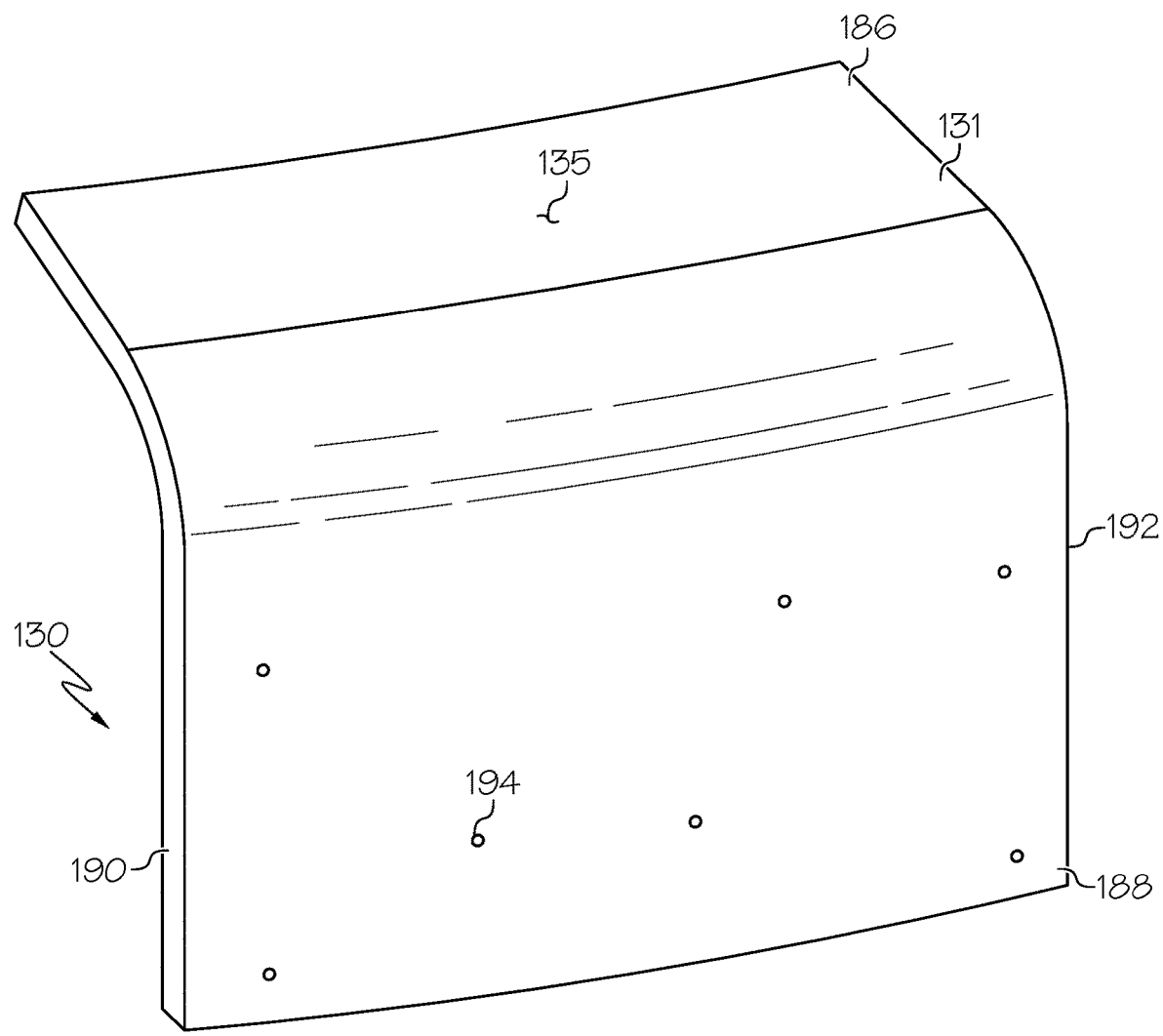
FIG. 8 is a schematic, perspective view of an example of a splice angle configured to be installed on the aft pressure bulkhead to form the pressure bulkhead assembly.

Referring now to FIG. 4, which illustrates an example of the method 1000, FIGS. 6 and 7, which schematically illustrate examples of a portion of the aft pressure bulkhead 110 and FIG. 8, which schematically illustrates an example of the splice angle 130.

In one or more examples, the method 1000 includes a step of (block 1002) making, or forming, the aft pressure bulkhead 110. The aft pressure bulkhead 110 is initially fabricated, or otherwise made, with a plurality of first holes 112 (FIGS. 6 and 7). For example, the aft pressure bulkhead 110 may be attached to an assembly jig (e.g., assembly jig 240 shown in FIG. 12) for drilling the first holes 112. The first holes 112 are pre-drilled in the aft pressure bulkhead 110 and are full-size holes configured to receive a corresponding fastener. Accordingly, the first holes 112 may also be referred to herein as pre-drilled full-size holes or first fastener holes. The first holes 112 are drilled at pre-defined locations 182 (FIGS. 6 and 7) on the aft pressure bulkhead 110. The pre-defined locations 182 of the first holes 112 (e.g., the pre-defined location 182 of each one of the first holes 112) refer to the pre-determined, actual (e.g., physical, real world) locations of the first holes 112 on the aft pressure bulkhead 110, as drilled.

Referring to FIGS. 6 and 7, the aft pressure bulkhead 110 includes a first surface 111 (e.g., as shown in FIG. 6) and a second surface 119 (e.g., as shown in FIG. 7), opposite the first surface 111, and a thickness 113. The first surface 111 may be an inner mold line (IML) of the aft pressure bulkhead 110 and the second surface 119 may be an outer mold line (OML) of the aft pressure bulkhead 110. Accordingly, the first surface 111 may also be referred to as an inner surface and the second surface 119 may also be referred to as an outer surface. With the pressure bulkhead assembly 150 installed within the fuselage 156 of the aircraft 104 (e.g., as shown in FIG. 3), the first surface 111 is on a pressurized side of the aft pressure bulkhead 110 and the second surface 119 is on the unpressurized side of the aft pressure bulkhead 110.

The first surface 111 includes, or forms, a first interface surface 115 (e.g., an aft pressure bulkhead-interface surface). The first interface surface 115 is located adjacent to a peripheral edge of the aft pressure bulkhead 110 and extends along an approximately circular path. The first interface surface 115 forms a mating contact surface that mates with the splice angles 130 during installation of the splice angles 130 on the aft pressure bulkhead 110. In other words, the first interface surface 115 is configured to receive the splice angles 130.

The first holes 112 are drilled through the thickness 113 of the aft pressure bulkhead 110 (e.g., extending between the first surface 111 and the second surface 119). The pre-defined locations 182 of the first holes 112 locate the first holes 112 through the first interface surface 115, for example, along an approximately circular path proximate (e.g., at or near) the peripheral edge of the aft pressure bulkhead 110. Only some of the first holes 112 are shown in FIGS. 6 and 7 (e.g., first holes 112 in a section of the aft pressure bulkhead 110) for the purpose of clarity of illustration. While not explicitly illustrated in FIGS. 6 and 7, it should be understood that the first holes 112 may extend around an entirety of the aft pressure bulkhead 110 (e.g., as shown in FIG. 1).

In one or more examples, the method 1000 includes a step of (block 1004) making the splice angles 130 (FIG. 8). The splice angles 130 are initially fabricated, or otherwise made, without a plurality of holes.

Referring briefly to FIG. 8, in one or more examples, the splice angle 130 includes a flange 186 and a skin splice 188 that extends from the flange 186 at an oblique angle. The flange 186 includes, or forms, a second interface surface 131 (e.g., a splice angle-interface surface). The second interface surface 131 forms a mating contact surface that mates with the first interface surface 115 of the aft pressure bulkhead 110 during installation of the splice angles 130 on the aft pressure bulkhead 110. The skin splice 188 includes, or forms, an arcuate segment of the circumferential surface 152 (e.g., shown in FIG. 1). The splice angle 130 includes a first mating edge 190 and a second mating edge 192, opposite the first mating edge 190. During installation of the splice angles 130 on the aft pressure bulkhead 110, the first mating edge 190 of one of the splice angles 130 abuts the second mating edge 192 of a directly adjacent one of the splice angles 130.

In one or more examples, the splice angles 130 may be fabricated with pilot holes 194 drilled through the skin splice 188. The pilot holes 194 are drilled at locations that approximately correspond to locations where full-size holes will be drilled through the skin splice 188 of the splice angle 130, the skin-first portion 178 and the skin-second portion 180 during installation of the pressure bulkhead assembly 150 in the fuselage 156 (e.g., as shown in FIG. 3).

Referring again to FIG. 4, in one or more examples, the method 1000 includes a step of (block 1006) measuring the first holes 112 in the aft pressure bulkhead 110, a step of (block 1008) measuring the first interface surface 115 of the aft pressure bulkhead 110 and a step of (block 1010) measuring the second interface surface 131 of the flange 186 of the splice angles 130 (e.g., of each one of the splice angles 130).

Referring to FIG. 5, the system 200 is configured to make accurate measurements of the aft pressure bulkhead 110 and the splice angles 130, process those measurements, machine the splice angles 130 (e.g., drill holes in the splice angles 130) and machine the shims 140 that comply with required tolerances, when needed.

In one or more examples, the system 200 includes a spatial relation apparatus 202. The spatial relation apparatus 202 includes a measurement machine, such as a Coordinate Measurement Machine (CMM) 204, and a computer system 206 (e.g., controller). The measurements taken by the CMM 204 are sent to the computer system 206. The computer system 206 provides the interface for a user to execute a measurement plan, process the measurements, and provide the processed measurements in an .XML format to an on demand emergent manufacturing (ODEM) application 220.

The computer system 206 includes a processor 208 and a memory 210. The memory stores one or more programs, such as, for example, a spatial analyzer program 212. The processor 208 executes the spatial analyzer program 212 to facilitate the spatial relation apparatus 202 in providing an interface for a user to execute the measurement plan, process the measurements, and provide the processed measurements, as described in the method 1000, to the ODEM application 220. In one or more examples, the processor 208 executes the spatial analyzer program 212 to direct the CMM 204 to execute operational steps (e.g., blocks 1006-1010) of the method 1000. For example, the processor 208 executes the spatial analyzer program 212 to perform an operational step of implementing a first measurement model (e.g., 3D seed model) of the aft pressure bulkhead 110 that includes a plurality of first measurement points for each one of the first holes 112 and for portions of the first interface surface 115, adjacent to the first holes 112, and a second measurement model (e.g., 3D seed model) for each one of the splice angles 130 that includes a plurality of second measurement points for portions of the second interface surface 131. The processor 208 then executes the spatial analyzer program 212 to perform further operational steps (e.g., blocks 1012-1026 and 1030) of method 1000. The ODEM application 220 generates network computer (NC) programs 224 and then validates the network computer (NC) programs (generates validated network computer (NC) programs 224) to enable drilling full-size holes in the splice angles 130, machining or fabricating necessary shims 140, and drilling full-size holes in the shims 140 (e.g., blocks 1028 and 1032) when provided with the compatibly-formatted .XML measurement files and 3D seed models from the spatial analyzer program 212. Each hole to be drilled will have an XYZ point to be drilled and an associated plane, which determines the orientation of the hole to be drilled.

The CMM 204 is configured to measure an object in a three-dimensional (3D) coordinate system, often in comparison to a computer aided design (CAD) model of the object. For example, the CMM 204 makes measurements of the aft pressure bulkhead 110 and of the splice angles 130 for drilling a plurality of second holes 132 in the splice angles 130 and, optionally, adding the shims 140 and drilling a plurality of third holes 142 in the shims 140 as necessary to fill the gaps between the aft pressure bulkhead 110 and the splice angles 130.

Figure 9:
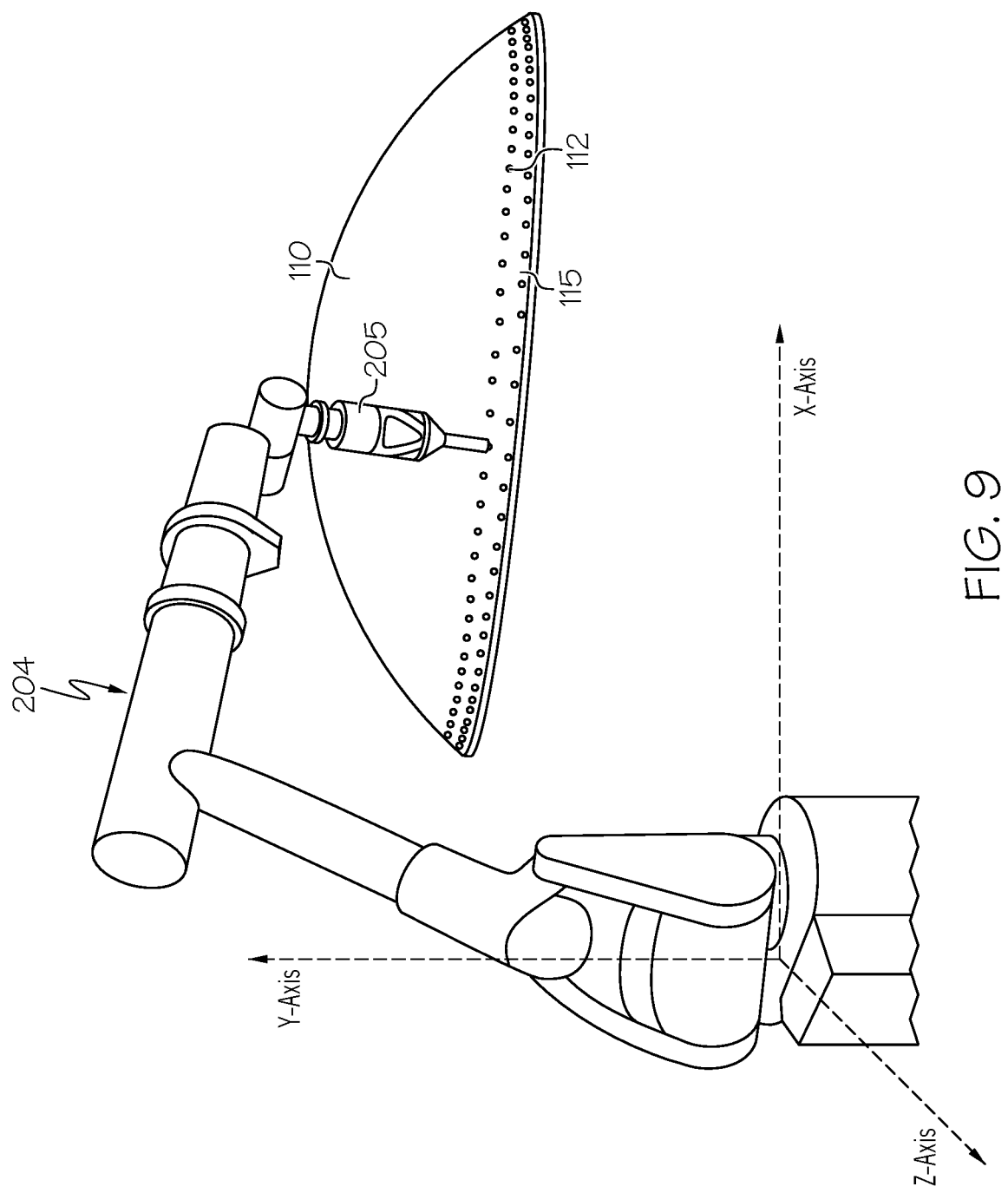
FIG. 9 is a schematic illustration of an example of the aft pressure bulkhead being measured by a measurement machine.

The CMM 204 may be any suitable metrological machine. The CMM 204 may be a Portable Coordinate Measuring machine. In one or more examples, the CMM 204 may be an articulated measurement arm 205, such as a ROMER arm machine (e.g., as shown in FIG. 9). For example, the CMM 204 includes a robotic arm that operates in 3D space with six or seven joints, having six degrees of freedom, which means that the robotic arm can move in three-dimensional space forward/backward, up/down, left/right combined with rotation about three perpendicular axes (roll, yaw, pitch). The movement along each of the three axes is independent of each other and independent of the rotation about any of these axes, having the six degrees of freedom.

In one or more examples, the CMM 204 may be mounted on a support platform adjacent to the structures being measured (e.g., the aft pressure bulkhead 110 and/or the splice angles 130) to take measurements of selected areas on the respective structures. In one or more examples, the CMM 204 may be mounted on, or otherwise form a component of, the assembly jig 240 (e.g., FIG. 12).

Figure 13:
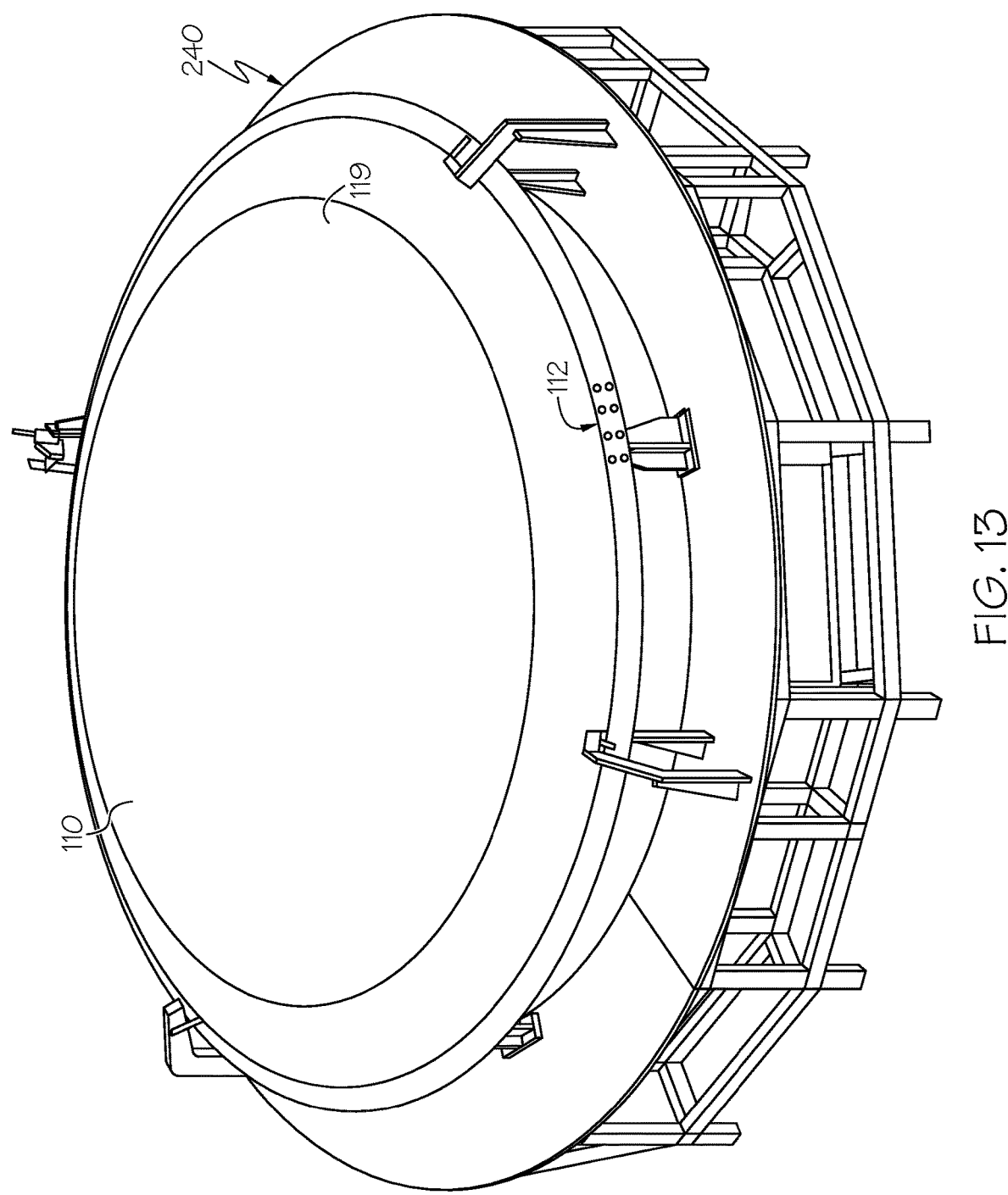
FIG. 13 is a schematic illustration of an example of the aft pressure bulkhead mounted on the assembly jig shown in FIG. 12.

Referring now to FIG. 9, which schematically illustrates an example of the CMM 204 taking measurements of selected areas (e.g., the first holes 112 and the first interface surface 115) on the aft pressure bulkhead 110. Generally, the CMM 204 is positioned adjacent to the aft pressure bulkhead 110 to be measured, such that the articulated measurement arm 205 can take measurements of the location and orientation of the first holes 112 and the first interface surface 115. In one or more examples, the aft pressure bulkhead 110 may be mounted on the assembly jig 240 (e.g., as shown in FIG. 13) for taking measurements by the CMM 204.

Figure 10:
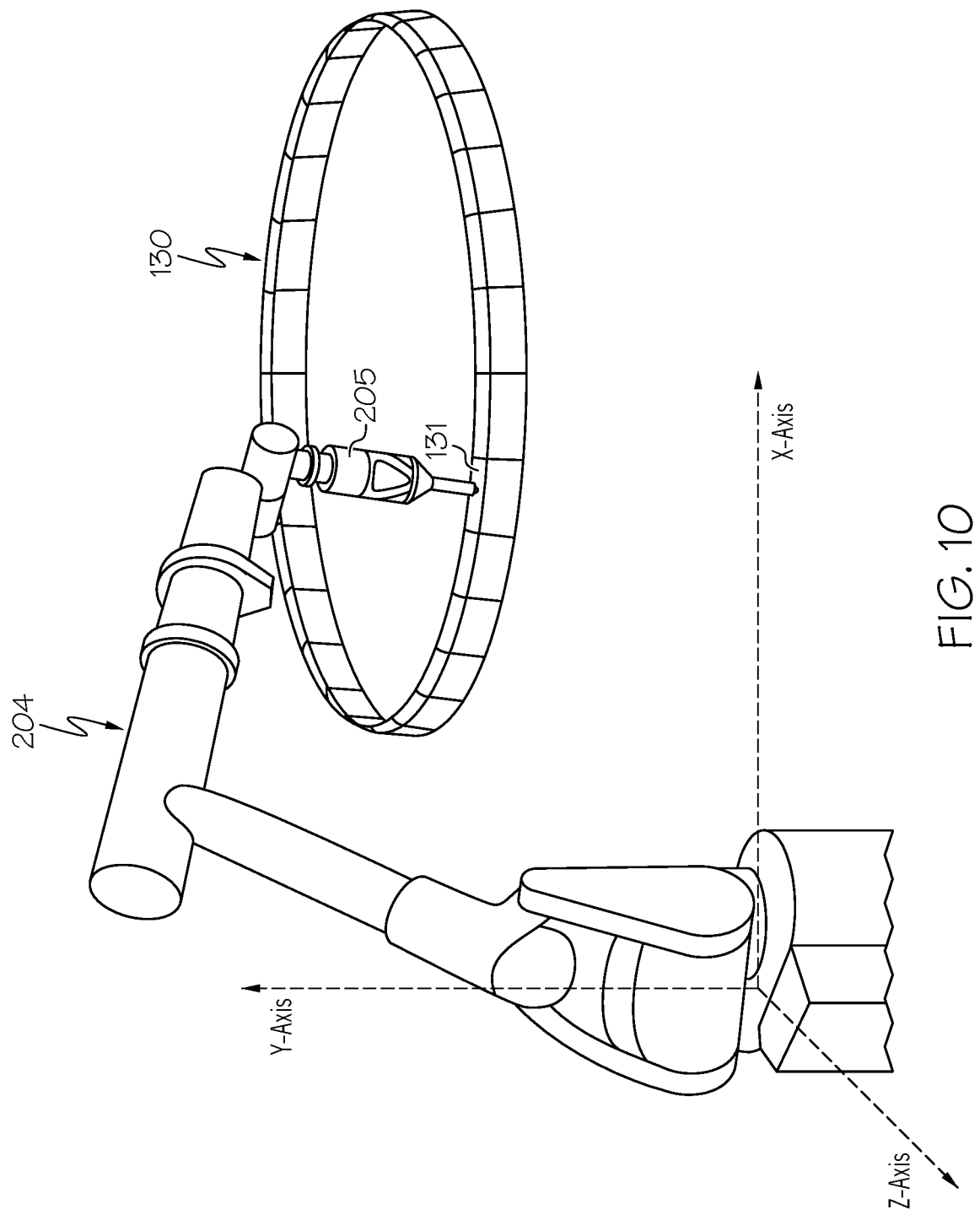
FIG. 10 is a schematic illustration of an example of the splice angles being measured by a measurement machine.

Referring now to FIG. 10, which schematically illustrates an example of the CMM 204 taking measurements of selected areas (e.g., the second interface surface 131) on the splice angles 130. Generally, the CMM 204 is positioned adjacent to the splice angles 130 to be measured, such that the articulated measurement arm 205 can take measurements of the second interface surface 131. In one or more examples, the plurality of splice angles 130 may mounted on the assembly jig 240 (e.g., FIG. 12) and positioned adjacent to one another to form the circumferential surface 152 having the nominal shape 154 for taking measurements of each one of the splice angles 130 by the CMM 204. Alternatively, in one or more examples, each one of the splice angles 130 may be mounted to support tooling for taking measurements by the CMM 204.

Accordingly, the system 200 may be configured to generate a plurality of NC programs for drilling the plurality of second holes 132 in the splice angles 130 based on obtained measurements.

It should be appreciated that other suitable types of coordinate measurement machines with sufficient accuracy may be used to take measurements of the selected areas of the structure being measured (e.g., aft pressure bulkhead 110 and splice angles 130), such as a handheld measuring device or a laser scanner. Further, it should be appreciated that the system 200 may use different coordinate measurement machines to take measurements of the aft pressure bulkhead 110 and the splice angles 130.

The computer system 206 may include a measurement software platform. The measure software platform may be any suitable type that includes programs that help take and process measurements. In one or more examples, the measurement software platform includes, or takes the form of, the spatial analyzer program 212 (may also referred to herein as spatial analyzer).

In one or more examples, the spatial analyzer program 212 may be adapted (e.g., programmed) to link a three-dimensional (3D) measurement seed model. For example, the system 200 may also include 3D measurement seed models that correspond to the aft pressure bulkhead 110 and the splice angles 130 in nominal configurations that include interfacing surfaces, nominal full-size holes, directions and surface geometry. As an example, for the aft pressure bulkhead 110, the corresponding measurement seed model may identify the first surface 111, the second surface 119, the first interface surface 115 and the first holes 112 (e.g., as shown in FIGS. 6 and 7). As an example, for each one of the splice angles 130, the corresponding measurement seed model may identify the flange 186, the skin splice 188 and the second interface surface 131 (e.g., as shown in FIG. 8).

In one or more examples, for each selected area to be measured, the spatial analyzer program 212 may operate to lead the CMM 204 (e.g., under automated computer control or under operator control) through the measurements and processing needed resulting in the coordinate system transform from an as-mounted CMM coordinate system to a 3D NC seed model in a nominal coordinate system for each one of the aft pressure bulkhead 110 and the splice angles 130.

In one or more examples, the system 200 provides the processed measurements in the .XML format to the on demand emergent manufacturing (ODEM) application 220. The ODEM application 220 generates and then validates a network computer (NC) program 222 to drill the second holes 132 (e.g., full-size holes) in the splice angles 130 and, optionally, to fabricate (e.g., machine and drill full-size holes in) the shims 140, as necessary, when provided with the compatibly formatted .XML measurement files and NC seed models. Each hole to be drilled will have an XYZ point to be drilled and an associated plane, which determines the orientation of the hole to be drilled. The ODEM application 220 also monitors the fabrication status of the drilled or machined part.

The ODEM application 220 may also transfers the network computer programs to a server that includes setup files that reflect the allowable tolerances of the drilled holes and shims and the quality assurance provisions per product definition data along with measurement plans, index plans, and installation plans.

In one or more examples, the system 200 also includes a 5-axis Computer Numerically Control (CNC) milling machine 230, or equivalent. The CNC machine 230 includes a network computer (NC) controller 232 that receives the NC programs 224. The system 200 takes measurements, processes the measurements in accordance with the requirement document in an .XML format. The ODEM application 220 then updates the NC seed model with the .XML formatted data, and then automatically creates the requisite NC program 224.

The CNC machine 230 drills the second holes 132 in the splice angles 130 (e.g., FIG. 11) and, optionally, machines the shims 140 and drills the third holes 142 in the shims 140 (e.g., FIG. 16), based on the NC programs 222. For example, each one the splice angles 130 may be secured and indexed on a drill fixture. The CNC machine 230 drills the second holes 132 in each one the splice angles 130 based on the NC programs 224. Similarly, each one the shims 140 may be secured and indexed on a drill fixture. The CNC machine 230 drills the third holes 142 in each one the shims 140 based on the NC programs 224

Referring now to FIGS. 4, 6 and 7, in one or more examples, the method 1000 includes a step of (block 1012) determining first locations 184 (e.g., aft pressure bulkhead hole locations) of the plurality of first holes 112 at the pre-defined locations 182 on the aft pressure bulkhead 110. The first locations 184 represent the determined (e.g., measured) locations of the first holes 112.

In an example, as illustrated in FIG. 6, the step of (block 1012) determining a first one of the measured first locations 184 of a first one of the first holes 112 includes a step of determining a first measured location 114 of a first hole 112a. The first hole 112a is an example of one of the plurality of first holes 112. For example, a first hole center 117 of the first hole 112a along the first surface 111 of the aft pressure bulkhead 110 is measured (e.g., block 1006), for example, by the CMM 204 (e.g., FIGS. 5 and 9), relative to an origin O in an example three-dimensional Cartesian coordinate system XYZ. As an example, the first measured location 114 of the first hole center 117 of the first hole 112a is measured as x1, y1, z1 in the XYZ coordinate system.

In an example, as illustrated in FIG. 7, the step of (block 1012) determining the first one of the measured first locations 184 of the first one of the first holes 112 also includes a step of determining a second measured location 118 of the first hole 112a. For example, a second hole center 121 of the first hole 112a along the second surface 119 of the aft pressure bulkhead 110 is measured (e.g., block 1006), for example, by the CMM 204 (e.g., FIGS. 5 and 9), relative to the origin O in an example three-dimensional Cartesian coordinate system XYZ. As an example, the second measured location 118 of the second hole center 121 of the first hole 112a is measured as x2, y2, z2 in the XYZ coordinate system.

It can be appreciated that the origin O (e.g., as shown in FIGS. 6 and 7) may be chosen for convenience, such as at an outer peripheral edge of the aft pressure bulkhead 110. In other instances, the origin O may be chosen at a different location or in other instances, the measurement is made using a different coordinate system, such as a polar or spherical coordinate system, without departing from the scope of the present disclosure.

In one or more examples, the method 1000 includes a step of (block 1014) determining first orientations 116 (e.g., aft pressure bulkhead hole orientations) of the plurality of first holes 112 on the aft pressure bulkhead 110. The first orientations 116 represent the determined (e.g., measured) orientations of the first holes 112.

In an example, as illustrated in FIGS. 6 and 7, the step of (block 1012) determining the first one of the first orientations 116 of the first one of the first holes 112 includes a step of determining a first orientation 116a of the first hole 112a. Determination of the first orientation 116a uses the first measured location 114 (e.g., indicated by x1, y1, z1 in the XYZ coordinate system) of the first hole center 117 of the first hole 112a (e.g., as shown in FIG. 6) and the second measured location 118 (e.g., indicated by x2, y2, z2 in the XYZ coordinate system) of the second hole center 121 of the first hole 112a (e.g., as shown in FIG. 7). Based on the first measured location 114 of the first hole center 117 and the second measured location 118 of the second hole center 121, the first orientation 116a of the first hole 112a is determined by the angle θ made along a plane 123 between the first hole center 117 and the second hole center 121 across the thickness 113 of the aft pressure bulkhead 110 (e.g., as shown in FIG. 7).

For example, in accordance with the method 1000, the computer system 206 processes the measurements to determine the relative location and orientation of the first hole 112a. The measurement step (e.g., block 1006) and determination steps (e.g., block 1012 and block 1014) are repeated for each one of the first holes 112 in the aft pressure bulkhead 110.

Referring now to FIGS. 4 and 6, in one or more examples, the method 1000 includes a step of (block 1016) determining a first surface profile 125 (e.g., a first interference surface profile) of the first interface surface 115 of the aft pressure bulkhead 110 (e.g., a portion of the first surface 111 of the aft pressure bulkhead 110) that is to mate with the second interface surface 131 of a corresponding one of the splice angles 130 (e.g., FIG. 8).

In an example, the first interface surface 115 of the aft pressure bulkhead 110 is scanned and a three-dimensional (3D) scan of the first interface surface 115 (e.g., first interference surface scan) is generated and stored. The 3D scan may be processed to generate the first surface profile 125. For example, the 3D scan produces 3D point cloud surface profile data for the first interface surface 115. In an example, the first interface surface 115 of the aft pressure bulkhead 110 is measured (e.g., scanned) by the CMM 204.

In one or more examples, the 3D scan of the first interface surface 115 is compared to a corresponding surface in the 3D seed model, to a nominal model of the aft pressure bulkhead 110 or to as-designed dimensions derived from drawings associated with the aft pressure bulkhead 110 to identify the measurement capability of the measurement machine performing the 3D scan, to ensure that the measurement process resulted in no errors, to ensure proper alignment has been achieved and/or to confirm no anomalies are present.

Figure 12:
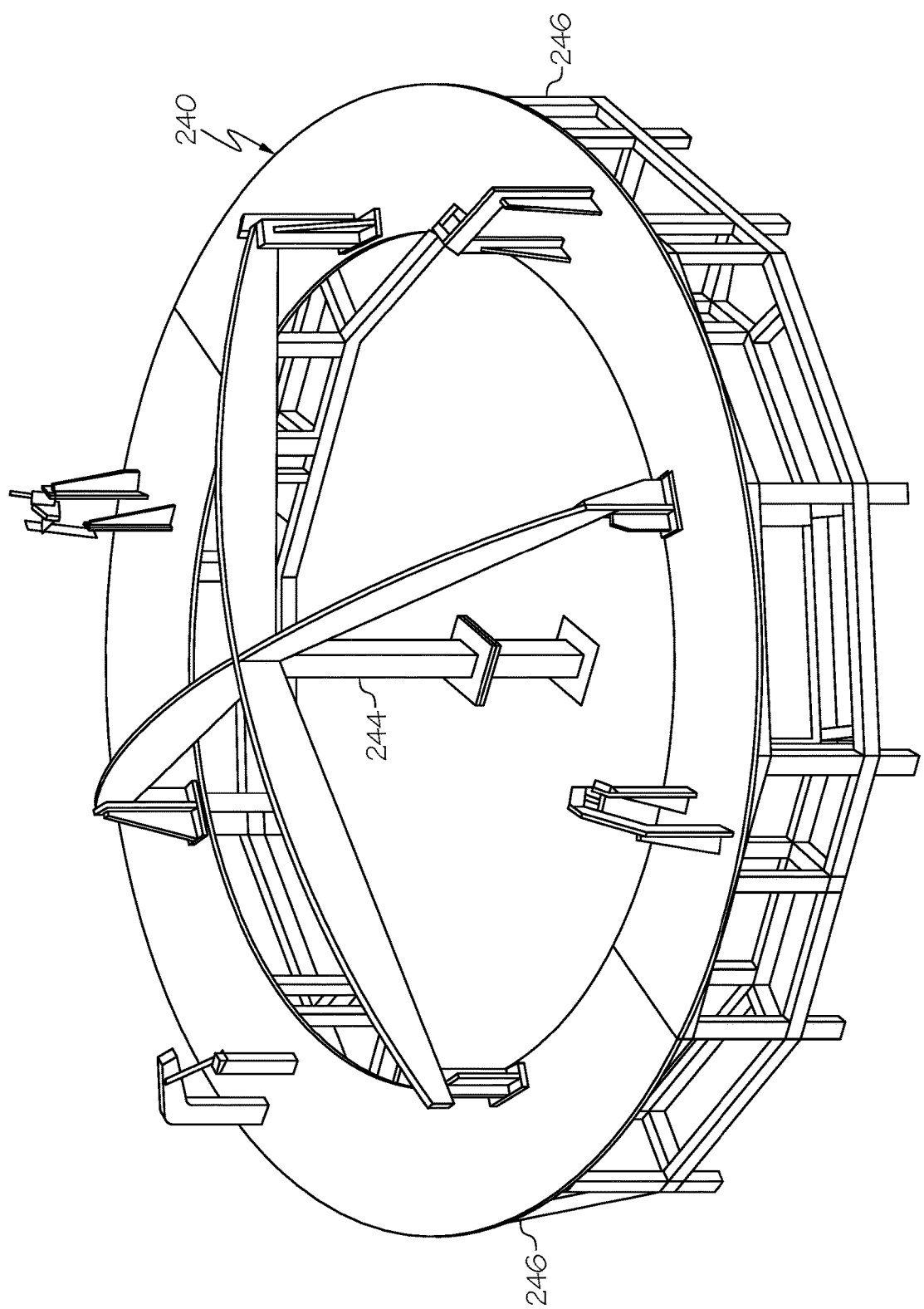
FIG. 12 is a schematic illustration of an example of an assembly jig.

Referring now to FIG. 12, which schematically illustrate an example of the assembly jig 240 and FIG. 13, which schematically illustrates an example of the aft pressure bulkhead 110 mounted on the assembly jig 240. In one or more examples, during the measuring steps (block 1006 and block 1008) and the determining steps (block 1012, block 1014 and block 1016), the aft pressure bulkhead 110 is mounted on the assembly jig 240 in a position corresponding to an assembly position of the aft pressure bulkhead 110. In one or more examples, the method 1000 includes a step of securing the aft pressure bulkhead 110 on the assembly jig 240 in a position resembling a final assembly position of the aft pressure bulkhead 110 for assembly of the pressure bulkhead assembly 150 prior to the steps of (block 1006 and block 1008) measuring the first holes 112 and the first interface surface 115 and the steps of (block 1012, block 1014 and block 1016) determining the first locations 184 and the first orientations 116 of the first holes 112 in the aft pressure bulkhead 110 and the first surface profile 125 of the aft pressure bulkhead 110. For example, the aft pressure bulkhead 110 is supported by an aft pressure bulkhead stand 244 (FIG. 12) and is secured to the assembly jig 240 such that the aft pressure bulkhead 110 has negligible freedom of movement while measuring the aft pressure bulkhead 110 and determining the measured first locations 184 and first orientations 116 of the first holes 112 and/or the first surface profile 125 of the first interface surface 115.

In one or more examples, the assembly jig 240 is support tooling that includes a plurality of segmented frames 246 that form a substantially circular shape. The aft pressure bulkhead stand 244 is positioned within, such as at an approximate center of, the circular shape of the segmented frames 246. In one or more examples, the CMM 204 (e.g., FIG. 9) is also positioned within the circular shape of the segmented frames 246 for taking measurements of the aft pressure bulkhead 110.

Referring now to FIGS. 4 and 8, in one or more examples, the method 1000 includes a step of (block 1018) determining a second surface profile 135 (e.g., a second interface surface profile) of the second interface surface 131 of the splice angle 130 (e.g., of each of the splice angles 130) to be coupled to the aft pressure bulkhead 110. As described above, the splice angles 130 are initially fabricated without full-size pre-drilled holes (e.g., without the plurality of second holes 132), as illustrated by example in FIG. 8.

In an example, the second interface surface 131 of the splice angle 130 is scanned and a three-dimensional (3D) scan of the second interface surface 131 (e.g., second interface surface scan) is generated and stored. The 3D scan may be processed to generate the second surface profile 135. For example, the 3D scan produces 3D point cloud surface profile data for the second interface surface 131. In an example, the second interface surface 131 of the each one of the splice angles 130 is measured (e.g., scanned) by the CMM 204.

In one or more examples, the 3D scan of the second interface surface 131 is compared to a corresponding surface in the 3D seed model, to a nominal model of the splice angles 130 or to as-designed dimensions derived from drawings associated with the splice angles 130 to identify the measurement capability of the measurement machine performing the 3D scan, to ensure that the measurement process resulted in no errors, to ensure proper alignment has been achieved and/or to confirm no anomalies are present.

Referring to FIGS. 1, 9 and 10, as described above, in one or more examples, the measured first locations 184 and first orientations 116 of the first holes 112 in the aft pressure bulkhead 110, the first surface profile 125 of the first interface surface 115 of the aft pressure bulkhead 110 and the second surface profile 135 of the second interface surface 131 of the splice angles 130 are measured and determined (e.g., blocks 1006-1018) using a measurement machine, such as the CMM 204 and the computer system 206. In one or more examples, the CMM 204 is mounted on a stable platform that prevents the CMM 204 from rocking or otherwise moving in order to take accurate measurements (e.g., as shown in FIGS. 9 and 10). In one or more examples, the CMM 204 implements a measurement plan outlined by the spatial analyzer program 212, as described above.

Referring to FIGS. 4 and 5, in one or more examples, in one or more examples, the method 1000 includes a step of (block 1020) generating a first 3D profile 214 representing the aft pressure bulkhead 110 and a step of (block 1022) generating a second 3D profile 216 representing the splice angles 130 (e.g., each one of the splice angles 130).

In one or more examples, the computer system 206 (FIG. 5) may execute a software application (e.g., the spatial analyzer program 212) to generate the first 3D profile 214 of the aft pressure bulkhead 110 and the second 3D profile 216 of the splice angles 130 (e.g., each one of the splice angles 130). The first 3D profile 214 of the aft pressure bulkhead 110 may be generated using the measured first locations 184 and first orientations 116 of the first holes 112 and the 3D scan of the first interface surface 115. The second 3D profile 216 of each one of the splice angles 130 may be generated using the 3D scan of the second interface surface 131. In an example, the first 3D profile 214 is a digital scan or virtual 3D model that represents the surface of the aft pressure bulkhead 110. In an example, the second 3D profile 216 is a digital scan or virtual 3D model that represents the surface of the splice angle 130.

Figure 11:
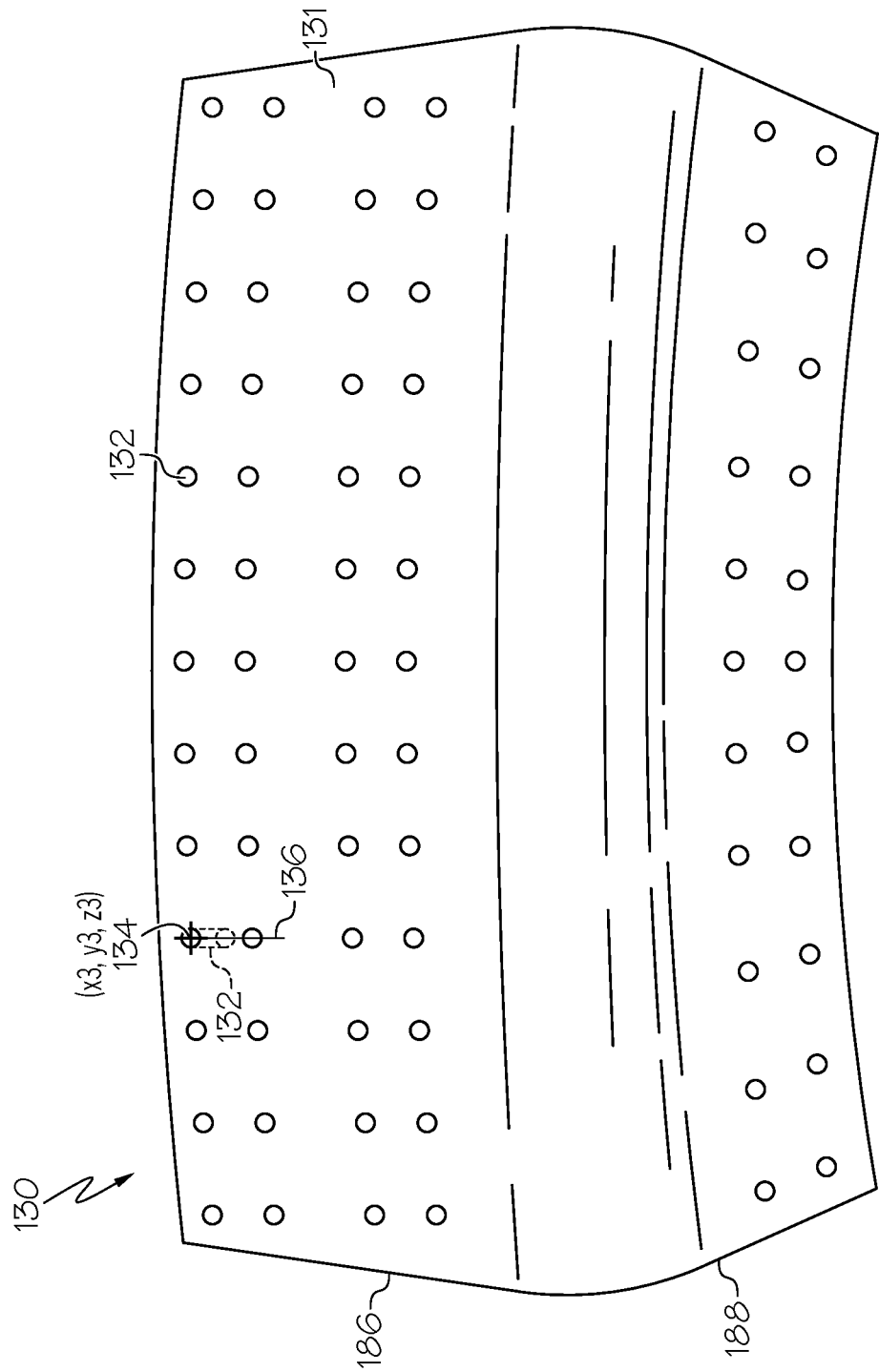
FIG. 11 is a schematic, perspective view of an example of the splice angle shown in FIG. 8 with a second plurality of holes drilled therein.

In one or more examples, the method 1000 includes a step of (block 1024) virtually overlaying, or aligning, the first 3D profile 214 of the aft pressure bulkhead 110 with the second 3D profile 216 of each of the splice angles 130 and a step of (block 1026) determining second locations 134 (e.g., splice angle hole locations) and second orientations 136 (e.g., splice angle hole orientations) of the plurality of second holes 132 to be drilled in each one of the splice angles 130 (e.g., as shown in FIG. 11). The second locations 134 represent the determined locations and orientations of the second holes 132 to be drilled in the splice angles 130.

In one or more examples, the first 3D profile 214 of the aft pressure bulkhead 110 is determined by the spatial analyzer program 212 of the system 200 that uses the measured first locations 184 and first orientations 116 of the first holes 112 in the aft pressure bulkhead 110 and the first surface profile 125 of the first interface surface 115 of the aft pressure bulkhead 110 measured by the CMM 204. For example, the aft pressure bulkhead 110 is measured and scanned by the CMM 204, and the spatial analyzer program 212 generates the first 3D profile 214 for the aft pressure bulkhead 110 based on the 3D cloud surface profile data.

In one or more examples, the second 3D profile 216 of each one of the splice angles 130 is similarly determined by the spatial analyzer program 212 using the second surface profile 135 of the second interface surface 131 associated with a corresponding portion of the first interface surface 115 of the aft pressure bulkhead 110. For example, each splice angle 130 is scanned by the CMM 204, and the spatial analyzer program 212 determines the second 3D profile 216 for each splice angle 130 based on the 3D cloud surface profile data.

Figure 14:
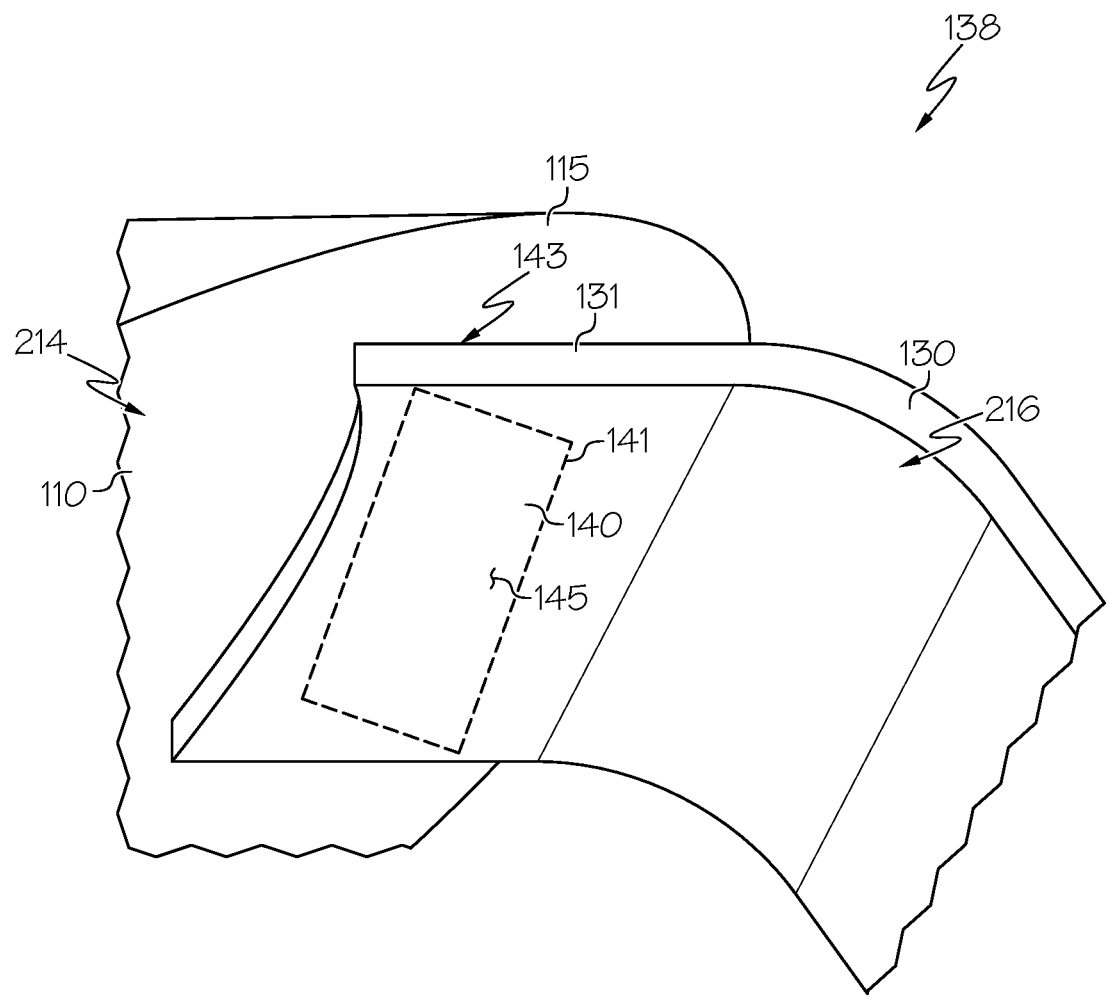
FIG. 14 is a schematic illustration of an example of a three-dimensional virtual overlay of the aft pressure bulkhead and the splice angle.

In one or more examples, the spatial analyzer program 212 of the system 200 performs the virtual overlaying step (block 1024), for example, generates a virtual overlay 138 (e.g., as shown in FIG. 14), by virtually aligning the first interface surface 115 of the aft pressure bulkhead 110, represented by the first 3D profile 214, with the corresponding second interface surface 131 of each of the splice angles 130, represented by the second 3D profile 216. Based on virtual overlaying the first 3D profile 214 of the aft pressure bulkhead 110 with the second 3D profile 216 of each of the splice angles 130, the spatial analyzer program 212 determines the second locations 134 (e.g., indicated by x3, y3, z3 in FIG. 11) and second orientations 136 of the second holes 132 to be drilled in each one of the splice angles 130 corresponding to the first holes 112 in the aft pressure bulkhead 110.

The step of (block 1026) determining the second locations 134 and the second orientations 136 of the plurality of second holes 132 to be drilled in each one of the splice angles 130 includes a step of determining locations and orientations of a drilling axis relative to the second 3D profile 216 of the splice angle 130 for drilling the second holes 132 in the splice angles 130. Accordingly, the second location 134 and the second orientation 136 of each one of the second holes 132, for example, determined by the spatial analyzer program 212, provides locations and orientations of a center bore axis of the second holes 132 in the splice angles 130 after drilling along the drilling axis, such that during fabrication of the pressure bulkhead assembly 150 (FIG. 1) the first holes 112 in the aft pressure bulkhead 110 coaxially align with the second holes 132 in the splice angles 130.

In one or more examples, the step of (block 1026) determining the second locations 134 and the second orientations 136 of the plurality of second holes 132 to be drilled in each one of the splice angles 130 includes a step of modifying, or adjusting, a location and/or orientation of at least one of the splice angles 130 relative to the aft pressure bulkhead 110 during, or following, the step of virtually overlaying the first 3D profile 214 of the aft pressure bulkhead 110 with the second 3D profile 216 of each of the splice angles 130. For example, the second 3D profiles 216 of the splice angles 130 may be arranged, or virtually positioned, adjacent to one another such that the second 3D profiles 216 form a virtual representation of the circumferential surface 152 having the nominal shape 154. The second 3D profile 216 representing at least one of the splice angles 130 and the first 3D profile 214 representing the aft pressure bulkhead 110 may be translated or rotated relative to each other to optimize the mating interface between the first interface surface 115 of the aft pressure bulkhead 110 and the second interface surfaces 131 of the splice angles 130. Once the locations and orientations of the splice angles 130 are optimized, a virtual overlay 138 of the first 3D profile 214 and the second 3D profile 216 is fixed and the second locations 134 and second orientations 136 of the second holes 132 may be determined based on the determined first locations 184 and first orientations 116 of the first holes 112.

While the example of the method 1000 describes steps of generating (block 1020 and block 1022) and overlaying (block 1024) the first 3D profile 214 of the aft pressure bulkhead 110 and the second 3D profile 216 of the splice angles 130 for determining (block 1026) the second locations 134 and second orientations 136 of the second holes 132 to be drilled in each of the splice angles 130, in other examples, the second locations 134 and second orientations 136 of the second holes 132 may be determined in other suitable manners. For example, in some examples, a least-squares method or other best fit optimization may be employed to best fit the first interface surface 115 represented by the first 3D profile 214 and the second interface surface 131 represented by the second 3D profile 216 for determining the second locations 134 and second orientations 136 of the second holes 132 to be drilled in each of the splice angles 130 that align with the first holes 112 in the aft pressure bulkhead 110.

Referring now to FIGS. 4 and 5 and to FIG. 11, which schematically illustrates an example of the splice angle 12 with the second holes 132 drilled therein. In one or more examples, the method 1000 includes a step of (block 1028) drilling the second holes 132 in the splice angles 130. The second holes 132 are drilled at the second locations 134 (e.g., indicated by x3, y3, z3 in FIG. 11) and second orientations 136, as determined after virtual overlaying (e.g., block 1024).

In one or more examples, the step of (1028) drilling the second holes 132 in the splice angles 130 includes a step of creating a program to drill the second holes 132 in the splice angles 130 that align with the measured first locations 184 and first orientations 116 of the first holes 112 (pre-drilled holes) in the aft pressure bulkhead 110 based on the determined second locations 134 and second orientations 136 of the second holes 132 to be drilled in the splice angles 130. In an example, the CNC machine 230 (FIG. 5) may drill the second holes 132 in the splice angles 130 based on the created program.

In one or more examples, the method 1000 includes a step of (block 1030) determining (e.g., estimating) gaps between the first interface surface 115 of the aft pressure bulkhead 110 and the second interface surface 131 of the splice angles 130. It can be appreciated that the gaps may be formed due to manufacturing tolerances for the aft pressure bulkhead 110 and the splice angles 130.

In one or more examples, when the spatial analyzer program 212 overlays the first 3D profile 214 of the aft pressure bulkhead 110 with the second 3D profile 216 of each of the splice angles 130, the spatial analyzer program 212 further estimates gaps between the first 3D profile 214 and the second 3D profile 216. The estimated gaps are representative of the gaps between the first interface surface 115 of the aft pressure bulkhead 110 and the second interface surface 131 of the splice angles 130. The estimated gaps are used to determine shimming required to fill any gaps between the first interface surfaces 115 of the aft pressure bulkhead 110 and the corresponding second interface surfaces 131 of the splice angles 130 during the overlay.

In one or more examples, the spatial analyzer program 212 also minimizes the gaps and, thus, the shimming requirements by adjusting the position of the second 3D profile 216 of one or more of the splice angles 130 relative to the first 3D profile 214 of the aft pressure bulkhead 110 during the step of virtual overlay and alignment (e.g., block 1024), as described above. For example, this gap minimization step is performed before the step of (block 1026) determining the second locations 134 and second orientations 136 of the second holes 132.

In one or more examples, in order to determine the shimming and/or spacing requirement, the spatial analyzer program 212 of system 200 determines a set of deviations or gaps between the first interface surface 115 of the aft pressure bulkhead 110 and the corresponding second interface surfaces 131 of the splice angles 130 during overlay and compares the set of deviations with design allowances for deviations in design or nominal 3D profiles of the aft pressure bulkhead 110 and the splice angles 130. The set of deviations between the first interface surface 115 of the aft pressure bulkhead 110 and the corresponding second interface surfaces 131 of the splice angles 130 includes, for example, dimensional and surface profile information. The set of deviations that exceed (e.g., greater than) the design allowances determines mating surfaces and profiles for potential shimming for the joint between the aft pressure bulkhead 110 and the splice angles 130.

Referring now to FIGS. 4 and 5, in one or more examples, the method 1000 includes a step of (block 1032) making the shims 140 used to fill the gaps between the aft pressure bulkhead 110 and the splice angles 130. For example, the CNC machine 230 (FIG. 5) may machine the shims 140 and drill the third holes 142 in the shims 140.

Referring now to FIG. 14, which schematically illustrates an example of a portion of the virtual overlay 138 (e.g., a joint interface) between the aft pressure bulkhead 110, represented by the first 3D profile 214, and the splice angle 130, represented by the second 3D profile 216. In one or more examples, when the first 3D profile 214 of the aft pressure bulkhead 110 is overlaid with the second 3D profile 216 of the splice angle 130, any deviations 143 (e.g., gaps) exceeding design allowances for deviations are used to determine an outline 141 and a third surface profile 145 of the shim 140 used to fill the gap between the first interface surface 115 and the second interface surface 131.

Figure 15:
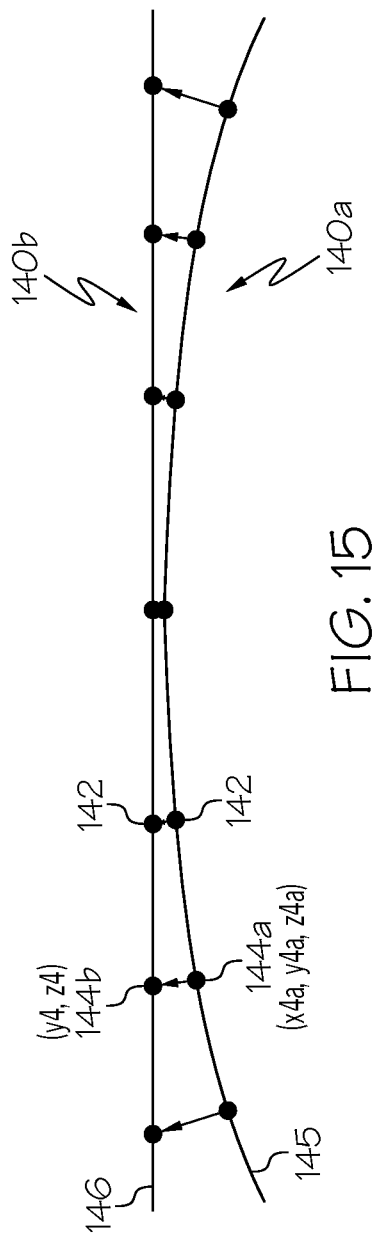
FIG. 15 is a schematic illustration of an example of a transformation of hole locations from a curved shim profile to a flat shim profile.

Referring to FIG. 15, which schematically illustrates a profile transform of the third surface profile 145 of the shim 140, as determined during overlay of the first 3D profile 214 with the second 3D profile 216, to a fourth surface profile 146 of the shim 140 for machining the shim 140. In one or more examples, the spatial analyzer program 212 (FIG. 5) initially creates a virtual curved shim 140a (e.g., having a curved 3D surface profile) corresponding to the set of deviations 143 (e.g., gaps) determined during the overlay of first 3D profile 214 (e.g., aft pressure bulkhead scan) and the second 3D profile 216 (e.g., splice angle scan). The outline 141 and the third surface profile 145 for the curved shim 140a are determined based on the dimensional details of the set of deviations 143 and represent the length, width, thickness and surface geometry of the shim 140 to be machined to fill the gap between the aft pressure bulkhead 110 and the splice angles 130. The spatial analyzer program 212 then transforms data for the determined set of deviations 143 from the virtual curved shim 140a to a virtual flat shim 140b (e.g., having a flat 2D shim surface) having the fourth surface profile 146. The fourth surface profile 146 represents the surface profile of a stock shim prior to being machined to fill the gap between the aft pressure bulkhead 110 and the splice angles 130.

Figure 16:
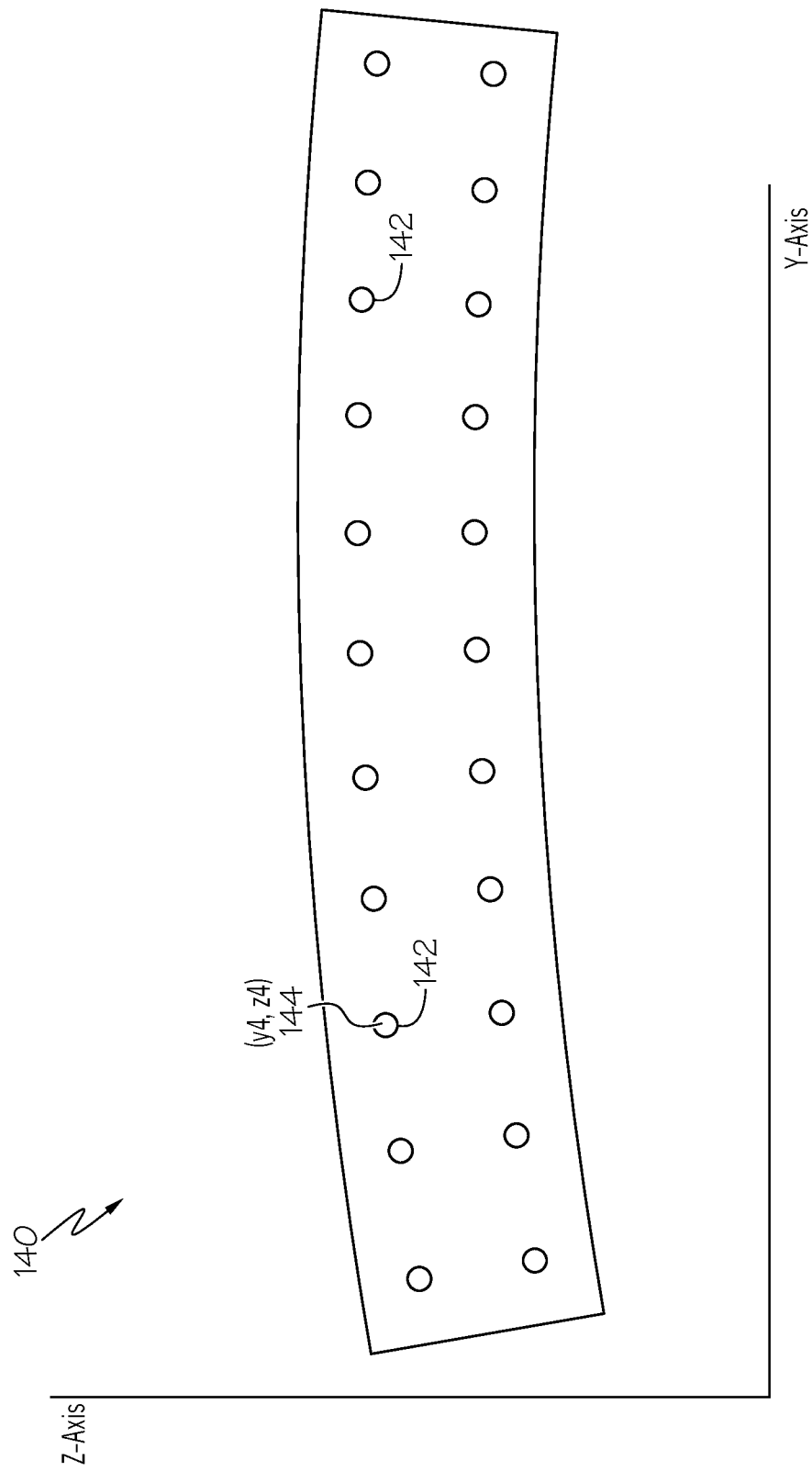
FIG. 16 is a schematic, plan view of an example of a shim of the pressure bulkhead assembly with third holes drilled therein.

Referring to FIGS. 4, 5 and 15, in one or more examples, the method 1000 includes a step of (block 1032) making the shims 140. In one or more examples, the step of (block 1032) making the shims 140 includes a step of determining third locations 144 (e.g., shim locations) of the plurality of third holes 142 to be drilled in each one of the shims 140 (FIG. 16). The third locations 144 of the third holes 142 correspond to the first locations 184 of the first holes 112 in the aft pressure bulkhead 110 and the second locations 134 of the second holes 132 in the splice angle 130.

In one or more examples, the step of determining the third locations 144 of the third holes 142 to be drilled in the shims 140 is performed by the spatial analyzer program 212 (FIG. 5). The spatial analyzer program 212 virtually overlays (e.g., block 1024) the first 3D profile 214 of the aft pressure bulkhead 110 with the second 3D profile 216 of the splice angle 130 such that the first holes 112 in the aft pressure bulkhead 110 and the second holes 132 in the splice angles 130 are aligned (e.g., approximately coaxially aligned within allowable tolerance). The spatial analyzer program 212 determines virtual third locations 144a (FIG. 15) in three-dimensional space (e.g., in a three-dimensional coordinate system indicated by x4a, y4a, z4a in FIG. 15) for the third holes 142 on the third surface profile 145 of the curved shim 140a. The spatial analyzer program 212 then transforms the third surface profile 145 of the curved shim 140a to the fourth surface profile 146 that is flat, or planar, and that represents the flat shim 140b (e.g., having a flat or planar surface profile) and transforms the virtual third locations 144a of the third holes 142 on the curved shim 140a to virtual third locations 144b in two-dimensional space (e.g., in a two-dimensional coordinate system indicated by y4, z4 in FIG. 15) of the third holes 142 on the flat shim 140b.

Referring now to FIGS. 4 and 5 and to FIG. 16, which schematically illustrates an example of the shim 140 with the third holes 142 drilled therein. For example, the CNC machine 230 (FIG. 5) may drill the second holes 132 in the splice angles 130.

In one or more examples, the step of (block 1032) making the shims 140 includes a step of drilling the third holes 142 in the shims 140 at the determined third locations 144 (e.g., indicated by y4, z4 in FIG. 16). As expressed above, in one or more examples, the third holes 142 are drilled in the shims 140 having an approximately flat configuration (e.g., a stock shim), such as the flat shim 140b having the fourth surface profile 146, and the third locations 144 correspond to the virtual third locations 144b (FIG. 15). In these examples, the step of (block 1032) making the shims 140 also includes a step of machining the shim 140 to form the third surface profile 145 of the shim 140 needed to fill the gap between the first interface surface 115 of the aft pressure bulkhead 110 and the second interface surface 131 of the splice angle 130. In other examples, the shim 140 may be machined to form the third surface profile 145 of the shim 140 needed to fill the gap between the first interface surface 115 of the aft pressure bulkhead 110 and the second interface surface 131 of the splice angle 130 before the third holes 142 are drilled in the shim 140. In these examples, the third locations 144 correspond to the virtual third locations 144a (FIG. 15).

Accordingly, in one or more examples, the step of determining the third locations 144 of the third holes 142 to be drilled in the shim 140 includes a step of determining the virtual third locations 144a of the third holes 142 relative to the third surface profile 145, a step of transforming the third surface profile 145 to the fourth surface profile 146 that is flat, or planar, and a step of determining the virtual third locations 144b of the third holes 142 relative to the fourth surface profile 146. In other words, the virtual third locations 144b are used as the third locations 144 for drilling the third holes 142. The step of drilling the third holes 142 in the shim 140 at the third locations 144 includes a step of drilling the third holes 142 at the virtual third locations 144b in a stock shim having the fourth surface profile 146.

In one or more examples, the step of drilling the third holes 142 in the shim 140 includes a step of creating a program to drill the third holes 142 in the shim 140 that align with the measured first locations 184 and first orientations 116 of the first holes 112 (pre-drilled holes) in the aft pressure bulkhead 110 and the second holes 132 (drilled or to be drilled) in a corresponding one of the splice angles 130, based on the determined third locations 144 of the third holes 142 to be drilled in the shim 140. In an example, the CNC machine 230 (FIG. 5) may drill the third holes 142 in the shims 140 based on the created program.

Referring to FIG. 5, in one or more examples, in accordance with the method 1000, a set of .XML measurement files is generated incorporating the determinations of the second locations 134 and second orientations 136 of the second holes 132 to be drilled in the splice angles 130, the outlines 141 and the third surface profiles 145 of the shims 140 to be machined and the determinations of the third locations 144 of the third holes 142 to be drilled in the shims 140. In an example, the spatial analyzer program 212 generates the set of .XML files and transmits the set of .XML files to the On-Demand Emergent Manufacturing (ODEM) application 220 (FIG. 5). The ODEM application 220 then generates the plurality of network computer (NC) programs 222 for drilling the second holes 132 in the splice angles 130, for machining the shims 140 to fill the gaps and for drilling the third holes 142 in the shims 140. The NC programs 222 are then validated, and the ODEM application 220 then transfers a set of validated NC programs 224 to the CNC machine 230 or equivalent. The NC controller 232 receives the validated NC programs 224 and the CNC machine 230 drills the second holes 132 in the splice angles 130, machines the shims 140, and drills the third holes 142 in the shims 140 based on the set of validated NC programs 224.

Figure 17:
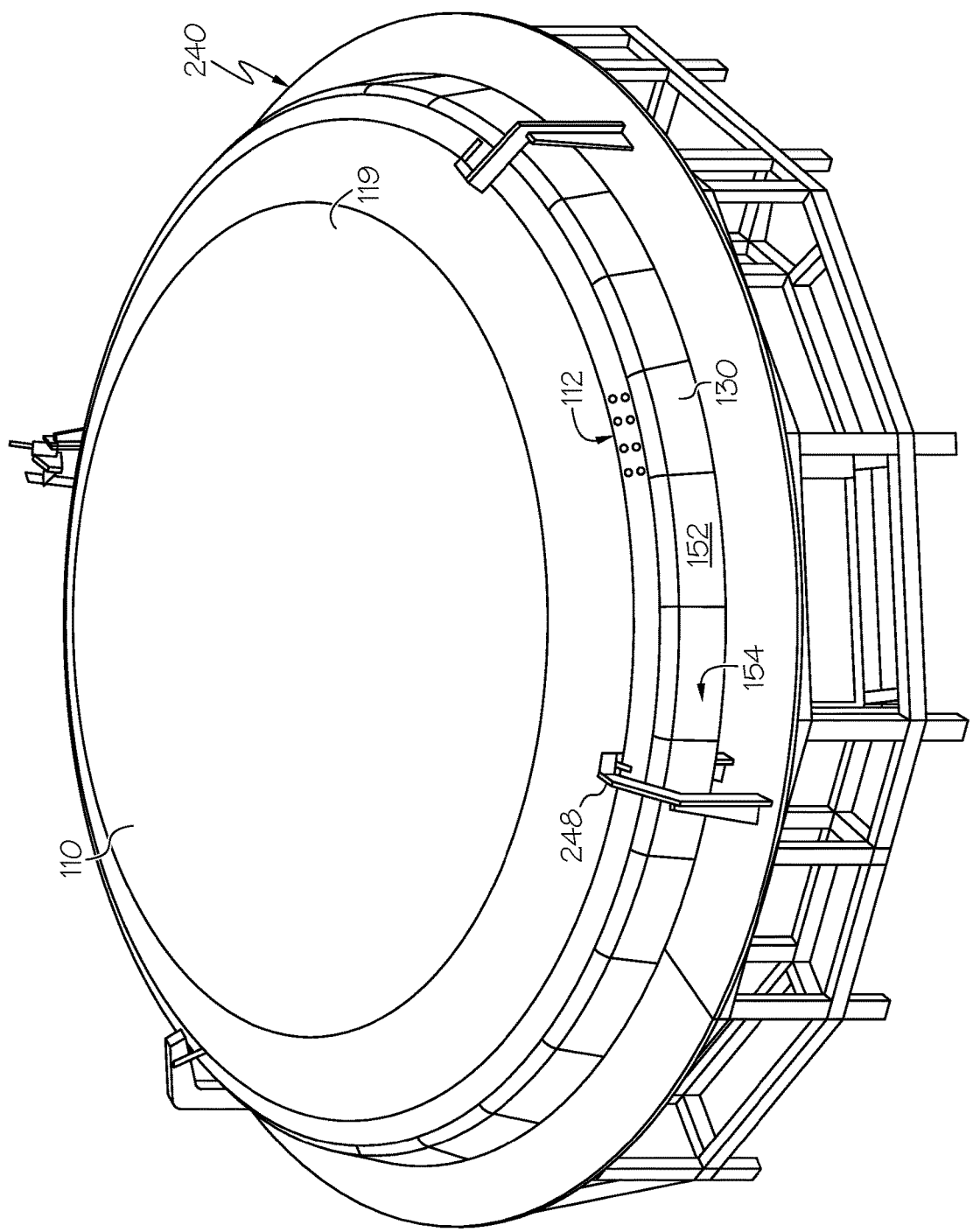
FIG. 17 is a schematic illustration of an example of the plurality of splice angles and the aft pressure bulkhead mounted on the assembly jig shown in FIG. 12.

Referring now to FIGS. 4 and 5 and to FIG. 17, which schematically illustrates an example of the plurality of splice angles 130 and the aft pressure bulkhead 110 mounted on the assembly jug 240 for assembly of the pressure bulkhead assembly 150 (FIG. 1). In one or more examples, the method 1000 includes a step of (block 1034) assembling the pressure bulkhead assembly 150.

In one or more examples. once the second holes 132 are drilled in the splice angles 130, the shims 140 are machined and the third holes 142 are drilled in the shims 140, the splice angles 130 and the shims 140, as needed to fill the gaps, are position at corresponding locations on the aft pressure bulkhead 110 such that the third holes 142 in the shims 140 and the second holes 132 in the splice angles 130 are aligned with the first holes 112 in the aft pressure bulkhead 110. Fasteners 196 (FIG. 5) are installed through the aligned first holes 112 in the aft pressure bulkhead 110, third holes 142 in the shims 140 and second holes 132 in the splice angles 130 to secure the splice angles 130 and the shims 140 to the corresponding location of the aft pressure bulkhead 110.

For example, as illustrated in FIG. 17, the splice angles 130 are mounted on the assembly jig 240 so that the splice angles 130 are positioned adjacent to one another to form the circumferential surface 152 having the nominal shape 154. In one or more examples, the assembly jig 240 includes a plurality of force assemblies 248, configured to apply clamping pressure to mating edges of the splice angles 130 and to index the mating edges of two adjacent splice angles 130. The aft pressure bulkhead 110 is positioned, indexed and secured over the splice angles 130 by the assembly jig 240.

The pressure bulkhead assembly 150 may include any number of splice angles 130 needed to form the circumferential surface 152 and for attachment of the pressure bulkhead assembly 150 the fuselage 156. In an example, thirty-two splice angles 130 are coupled to the aft pressure bulkhead 110 to form the pressure bulkhead assembly 150.

The shims 140 (not visible in FIG. 17) are positioned between the second interface surface 131 (e.g., as shown in FIG. 8) of each splice angle 130 and the first interface surface 115 (e.g., as shown in FIG. 6) of the aft pressure bulkhead 110 to fill any gaps between the splice angles 130 and the aft pressure bulkhead 110. The shims 140 maintain the nominal shape 154 when the splice angles 130 are joined to the aft pressure bulkhead 110.

The aft pressure bulkhead 110 is positioned so that the second interface surface 131 mates with a corresponding portion (e.g., section) of the first interface surface 115 and that the first holes 112 the aft pressure bulkhead 110, the second holes 132 in the splice angles 130 (e.g., as shown in FIG. 11) and the third holes 142 in the shims 140 (e.g., as shown in FIG. 16) are aligned with each other. The fasteners 196 (FIG. 5) are sent through the aligned set of holes to join the aft pressure bulkhead 110, the splice angles 130 and the shims 140 together to form the pressure bulkhead assembly 150. The fasteners 196 may take any desirable form, such as permanent fasteners.

Figure 18:
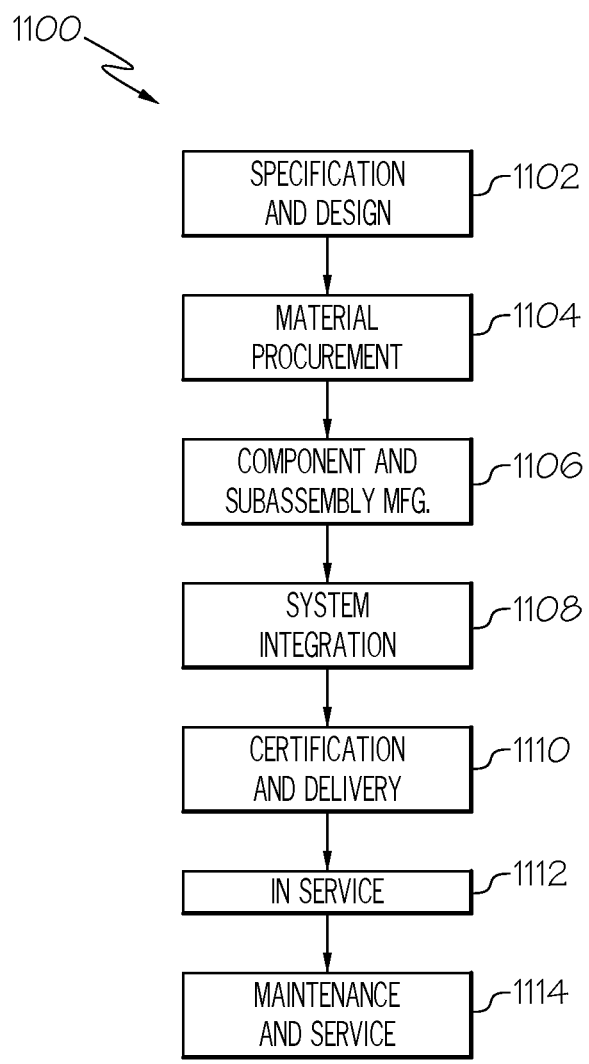
FIG. 18 is a flow diagram of an aircraft manufacturing and service methodology.

Referring now to FIGS. 2 and 18, examples of the method 1000, the system 200 and the pressure bulkhead assembly 150 may be related to, or used in the context of, an aircraft manufacturing and service method 1100, as shown in the flow diagram of FIG. 18 and the aircraft 104, as schematically illustrated in FIG. 2. For example, the aircraft 104 and/or the aircraft production and service methodology 1100 may utilize the pressure bulkhead assembly 150 made according to the method 1000 and/or using the system 200 described with respect to FIGS. 1 and 3-17.

Referring to FIG. 2, examples of the aircraft 104 may include an airframe 158 that forms the wings 108 and the fuselage 156 having the interior 172. The aircraft 104 also includes a plurality of high-level systems 160. Examples of the high-level systems 160 include one or more of a propulsion system 162, an electrical system 164, a hydraulic system 166, and an environmental system 168 (e.g., environmental control system). In other examples, the aircraft 104 may include any number of other types of systems, such as a communications system, a flight control system, a guidance system, a weapons system, and the like.

Referring to FIG. 18, during pre-production, the method 1100 includes specification and design of the aircraft 104 (block 1102) and material procurement (block 1104). During production of the aircraft 104, component and subassembly manufacturing (block 1106) and system integration (block 1108) of the aircraft 104 take place. Thereafter, the aircraft 104 goes through certification and delivery (block 1110) to be placed in service (block 1112). Routine maintenance and service (block 1114) includes modification, reconfiguration, refurbishment, etc. of one or more systems of the aircraft 104.

Each of the processes of the method 1100 illustrated in FIG. 18 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the pressure bulkhead assembly 150, the system 200 and the method 1000 shown and described herein may be employed during any one or more of the stages of the manufacturing and service method 1100 shown in the flow diagram illustrated by FIG. 18. In an example, implementations of the pressure bulkhead assembly 150, the system 200 and the method 1000 may form a portion of component and subassembly manufacturing (block 1106) and/or system integration (block 1108). For example, production of the pressure bulkhead assembly 150, made using the system 200 or according to the method 1000, or production of the aircraft 104 that includes the pressure bulkhead assembly 150 may correspond to component and subassembly manufacturing (block 1106). Further, the pressure bulkhead assembly 150, made using the system 200 or according to the method 1000, may be utilized in a manner similar to components or subassemblies prepared while the aircraft 104 is in service (block 1112). Also, the pressure bulkhead assembly 150, made using the system 200 or according to the method 1000, may be utilized during system integration (block 1108) and certification and delivery (block 1110). Similarly, implementations of the pressure bulkhead assembly 150, made using the system 200 or according to the method 1000, may be utilized, for example and without limitation, while the aircraft 104 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to structural component assemblies and systems and methods of making the same for other types of vehicles (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-3 and 5-17, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-3 and 5-17, referred to above, need be included in every example and not all elements, features, and/or components described herein are necessarily depicted in each illustrative example. Accordingly, some of the elements, features, and/or components described and illustrated in FIGS. 1-3 and 5-17 may be combined in various ways without the need to include other features described and illustrated in FIGS. 1-3 and 5-17, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-3 and 5-17, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-3 and 5-17, and such elements, features, and/or components may not be discussed in detail herein with reference to each of FIGS. 1-3 and 5-17. Similarly, all elements, features, and/or components may not be labeled in each of FIGS. 1-14, but reference numerals associated therewith may be utilized herein for consistency.

In FIGS. 4 and 18, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 4 and 18 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the pressure bulkhead assembly 150, the system 200 and the method 1000 have been shown and described, modifications may occur to those skilled in the art upon reading the specification. The present application includes such modifications and is limited only by the scope of the claims.

What is claimed is:

1. A method of making a pressure bulkhead assembly, the method comprising steps of:
   determining first locations of a plurality of first holes, pre-drilled in an aft pressure bulkhead;
   determining first orientations of the plurality of first holes in the aft pressure bulkhead;
   determining a first surface profile of a first interface surface of the aft pressure bulkhead;
   securing the aft pressure bulkhead on an assembly jig in a position that approximates a final assembly position of the aft pressure bulkhead for assembly of the pressure bulkhead assembly prior to the steps of determining the first locations and the first orientations of the plurality of first holes in the aft pressure bulkhead and the first surface profile of the aft pressure bulkhead;
   determining a second surface profile of a second interface surface of each one of a plurality of splice angles that corresponds to an associated portion of the first interface surface of the aft pressure bulkhead, wherein the plurality of splice angles is configured to be coupled to the aft pressure bulkhead;
   determining second locations and second orientations of a plurality of second holes to be drilled in the plurality of splice angles, wherein the plurality of second holes correspond to the plurality of first holes in the aft pressure bulkhead; and
   drilling the plurality of second holes in each one of the plurality of splice angles at the second locations and the second orientations.

2. The method of claim 1, further comprising forming the aft pressure bulkhead with the plurality of first holes pre-drilled at pre-defined locations, wherein the plurality of first holes are full-size holes.

3. The method of claim 1, wherein the step of drilling the plurality of second holes in each one of the plurality of splice angles comprises:
receiving the second surface profile of the second interface surface of one of the plurality of splice angles and the second locations and the second orientations of the plurality of second holes to be drilled in the one of the plurality of splice angles associated with corresponding ones of the plurality of first holes in the aft pressure bulkhead;
aligning the one of the plurality of splice angles on a CNC machine; and
drilling the plurality of second holes in the one of the plurality of splice angles through the second interface surface and at the second locations and the second orientations.

4. The method of claim 1, further comprising:
mating the second interface surface of each one of the plurality of splice angles on a corresponding portion of the first interface surface of the aft pressure bulkhead such that the plurality of second holes in each one of the plurality of splice angles are aligned with the plurality of first holes in the aft pressure bulkhead; and
installing fasteners through the plurality of first holes in the aft pressure bulkhead and the plurality of second holes in the plurality of splice angles to secure the plurality of splice angles to the aft pressure bulkhead.

5. The method of claim 1, further comprising steps of:
generating a first three-dimensional profile of the aft pressure bulkhead based at least in part on the first surface profile, the first locations and the first orientations of the plurality of first holes;
generating a second three-dimensional profile of each one of the plurality of splice angles based at least in part on the second surface profile of each one of the plurality of splice angles; and
virtually overlaying the first three-dimensional profile of the aft pressure bulkhead and the second three-dimensional profile of the plurality of splice angles,
wherein the step of determining the second locations and the second orientations of the plurality of second holes to be drilled in the plurality of splice angles comprises determining locations and orientations of a drilling axis for drilling the plurality of second holes relative to the second three-dimensional profile of each one of the plurality of splice angles.

6. The method of claim 5, further comprising steps of:
based at least in part on a virtual overlay of the first three-dimensional profile of the aft pressure bulkhead and the second three-dimensional profile of the plurality of splice angles, determining an outline and a third surface profile for a shim to be positioned between the first interface surface of the aft pressure bulkhead and the second interface surface of a corresponding one of the plurality of splice angles;
determining third locations of a plurality of third holes to be drilled in the shim, wherein the plurality of third holes correspond to a portion of the plurality of first holes in the aft pressure bulkhead and the plurality of second holes in the corresponding one of the plurality of splice angles; and
drilling the plurality of third holes in the shim at the third locations.

7. The method of claim 6, further comprising:
mating the second interface surface of each one of the plurality of splice angles on a corresponding portion of the first interface surface of the aft pressure bulkhead such that the plurality of second holes in each one of the plurality of splice angles is aligned with the plurality of first holes in the aft pressure bulkhead;
positioning the shim between the second interface surface of a corresponding one of the plurality of splice angles and the first interface surface of the aft pressure bulkhead such that the plurality of third holes in the shim are aligned with the plurality of first holes in the aft pressure bulkhead and the plurality of second holes in the corresponding one of the plurality of splice angles; and
installing fasteners through the plurality of first holes in the aft pressure bulkhead, the plurality of third holes in the shim and the plurality of second holes in the corresponding one of the plurality of splice angles to secure the shim and the corresponding one of the plurality of splice angles to the aft pressure bulkhead.

8. The method of claim 6, wherein the step of determining the outline and the third surface profile of the shim further comprises, based at least in part on the virtual overlay, determining a set of deviations between the first three-dimensional profile of the aft pressure bulkhead and the second three-dimensional profile of the corresponding one of the plurality of splice angles greater than a design allowance based on deviations in design three-dimensional profiles of the aft pressure bulkhead and the corresponding one of the plurality of splice angles.

9. The method of claim 8, wherein:
the step of determining the third locations of the plurality of third holes to be drilled in the shim comprises:
determining virtual third locations of the plurality of third holes relative to the third surface profile;
transforming the third surface profile to a fourth surface profile that is flat; and
determining virtual third locations of the plurality of third holes relative to the fourth surface profile; and
the step of drilling the plurality of third holes in the shim at the third locations comprises drilling the plurality of third holes at the virtual third locations in a stock shim having the fourth surface profile.

10. The method of claim 5, wherein the step of determining the second locations and the second orientations of the plurality of second holes to be drilled in the plurality of splice angles comprises a step of adjusting at least one of a location and an orientation of the second three-dimensional profile of at least one of the plurality of splice angles relative to the first three-dimensional profile of the aft pressure bulkhead during the step of virtually overlaying the first three-dimensional profile of the aft pressure bulkhead and the second three-dimensional profile of the plurality of splice angles.

11. The method of claim 10, wherein step of adjusting at least one of the location and the orientation of the second three-dimensional profile of at least one of the plurality of splice angles relative to the first three-dimensional profile of the aft pressure bulkhead is performed using a least-squares method.

12. The method of claim 5, wherein the step of virtually overlaying the first three-dimensional profile of the aft pressure bulkhead and the second three-dimensional profile of the plurality of splice angles comprises applying a best-fit optimization process to optimize alignment of the second interface surface of each one of the plurality of splice angles and a corresponding portion of the first interface surface of the aft pressure bulkhead.

13. A method of making a pressure bulkhead assembly, the method comprising steps of:
  determining first locations of a plurality of first holes, pre-drilled in an aft pressure bulkhead;
  determining first orientations of the plurality of first holes in the aft pressure bulkhead;
  determining a first surface profile of a first interface surface of the aft pressure bulkhead;
  determining a second surface profile of a second interface surface of each one of a plurality of splice angles that corresponds to an associated portion of the first interface surface of the aft pressure bulkhead, wherein the plurality of splice angles is configured to be coupled to the aft pressure bulkhead;
  determining second locations and second orientations of a plurality of second holes to be drilled in the plurality of splice angles, wherein the plurality of second holes correspond to the plurality of first holes in the aft pressure bulkhead;
  receiving the second surface profile of the second interface surface of each one of the plurality of splice angles and the second locations and the second orientations of the plurality of second holes to be drilled in each one of the plurality of splice angles associated with corresponding ones of the plurality of first holes in the aft pressure bulkhead;
  aligning each one of the plurality of splice angles on a CNC machine; and
  drilling the plurality of second holes in each one of the plurality of splice angles through the second interface surface and at the second locations and the second orientations.

14. The method of claim 13, further comprising a step of forming the aft pressure bulkhead with the plurality of first holes pre-drilled at pre-defined locations, wherein the plurality of first holes are full-size holes.

15. The method of claim 13, wherein the step of drilling the plurality of second holes in each one of the plurality of splice angles comprises:
  generating a first three-dimensional profile of the aft pressure bulkhead based at least in part on the first surface profile, the first locations and the first orientations of the plurality of first holes;
  generating a second three-dimensional profile of each one of the plurality of splice angles based at least in part on the second surface profile of each one of the plurality of splice angles; and
  virtually overlaying the first three-dimensional profile of the aft pressure bulkhead and the second three-dimensional profile of the plurality of splice angles,
  wherein the step of determining the second locations and the second orientations of the plurality of second holes to be drilled in the plurality of splice angles comprises determining locations and orientations of a drilling axis for drilling the plurality of second holes relative to the second three-dimensional profile of each one of the plurality of splice angles.

16. The method of claim 14, further comprising a step of mating the second interface surface of each one of the plurality of splice angles on a corresponding portion of the first interface surface of the aft pressure bulkhead such that the plurality of second holes in each one of the plurality of splice angles are aligned with the plurality of first holes in the aft pressure bulkhead.

17. The method of claim 16, further comprising a step of installing fasteners through the plurality of first holes in the aft pressure bulkhead and the plurality of second holes in the plurality of splice angles to secure the plurality of splice angles to the aft pressure bulkhead.

18. The method of claim 15, further comprising steps of:
  based at least in part on a virtual overlay of the first three-dimensional profile of the aft pressure bulkhead and the second three-dimensional profile of the plurality of splice angles, determining an outline and a third surface profile for a shim to be positioned between the first interface surface of the aft pressure bulkhead and the second interface surface of a corresponding one of the plurality of splice angles;
  determining third locations of a plurality of third holes to be drilled in the shim, wherein the plurality of third holes correspond to a portion of the plurality of first holes in the aft pressure bulkhead and the plurality of second holes in the corresponding one of the plurality of splice angles; and
  drilling the plurality of third holes in the shim at the third locations.

19. The method of claim 18, wherein the step of determining the outline and the third surface profile of the shim further comprises, based at least in part on the virtual overlay, determining a set of deviations between the first three-dimensional profile of the aft pressure bulkhead and the second three-dimensional profile of the corresponding one of the plurality of splice angles greater than a design allowance based on deviations in design three-dimensional profiles of the aft pressure bulkhead and the corresponding one of the plurality of splice angles.

20. The method of claim 18, further comprising:
  mating the second interface surface of each one of the plurality of splice angles on a corresponding portion of the first interface surface of the aft pressure bulkhead such that the plurality of second holes in each one of the plurality of splice angles is aligned with the plurality of first holes in the aft pressure bulkhead;
  positioning the shim between the second interface surface of a corresponding one of the plurality of splice angles and the first interface surface of the aft pressure bulkhead such that the plurality of third holes in the shim are aligned with the plurality of first holes in the aft pressure bulkhead and the plurality of second holes in the corresponding one of the plurality of splice angles; and
  installing fasteners through the plurality of first holes in the aft pressure bulkhead, the plurality of third holes in the shim and the plurality of second holes in the corresponding one of the plurality of splice angles to secure the shim and the corresponding one of the plurality of splice angles to the aft pressure bulkhead.

* * * * *